United States Patent Office 3,513,164
Patented May 19, 1970

3,513,164
5',6'-DIHYDRO-2H-PYRAN-4'-YL ETHERS OF PROGESTATIONAL STEROIDS
Alexander D. Cross, Mexico City, Mexico, and John A. Edwards, Los Altos, Calif., assignors to Syntex Corporation, Panama, Panama, a corporation of Panama
No Drawing. Continuation-in-part of application Ser. No. 731,267, May 22, 1968. This application Oct. 9, 1968, Ser. No. 766,328
Int. Cl. C07c *173/00*
U.S. Cl. 260—239.55
44 Claims

ABSTRACT OF THE DISCLOSURE

The 5',6'-dihydro-2H-pyran-4'-yl ethers of progestational steroids have high oral activities.

This is a continuation-in-part of application Ser. No. 731,267 filed May 22, 1968.

This invention relates to novel and useful 5',6'-dihydro-2H-pyran-4'-yl ethers of progestational steroids, the steroid nucleus thus bearing a new group represented by the formula

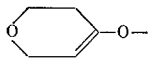

In the preferred embodiment, this new group is added at the C-3 position of pregnane progestational agents and at the C-3, C-17β, or C-3,17β positions of the androstane progestational agents.

The preferred progestational steroidal ethers of this invention can be represented by the formulas:

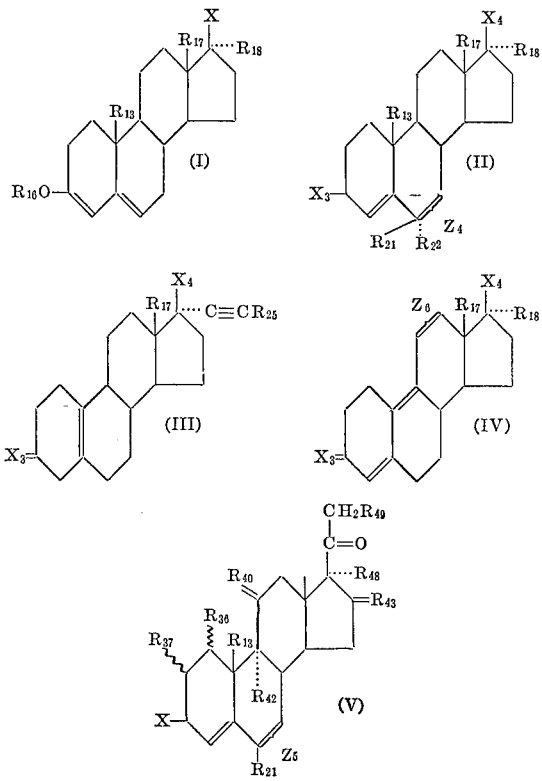

wherein $R_{13}$ is hydrogen or methyl; $R_{16}$ is lower alkyl or lower cycloalkyl; $R_{17}$ is methyl or ethyl; $R_{18}$ is lower alkenyl, such as vinyl and propenyl, lower alkynyl (including lower haloalkynyl with a halogen, such as fluoro, chloro, or bromo), such as ethynyl, fluoroethynyl, chloroethynyl, propynyl, trifluoropropynyl, and the like, and

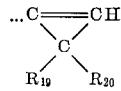

wherein $R_{19}$ and $R_{20}$ each is hydrogen, chloro, or fluoro; $R_{21}$, $R_{22}$, and $R_{25}$ each is hydrogen, methyl, fluoro, or chloro; in Formula II when $Z_4$ is a double bond, $R_{20}$ is absent; in Formula V when $Z_5$ is a single bond, $R_{19}$ can have either an α or β orientation; $R_{36}$ and $R_{37}$ each is hydrogen or, taken together, a methylene group having the formula

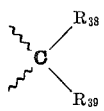

wherein $R_{38}$ and $R_{39}$ each is hydrogen, chloro, or fluoro; $R_{40}$ is keto or

wherein $R_{41}$ is hydrogen, chloro, or hydroxyl; and when $R_{41}$ is hydrogen, $R_{13}$ and $R_{42}$ is hydrogen; $R_{42}$ is hydrogen, chloro, or fluoro; $R_{43}$ is methylene,

wherein $R_{44}$ and $R_{45}$ each is hydrogen or methyl, or taken together with $R_{48}$, is

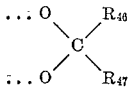

wherein $R_{46}$ and $R_{47}$ each is hydrogen, alkyl, or aryl, the latter two groups having up to eight carbons; $R_{48}$ is hydrogen, hydroxyl, or conventional hydrolyzable esters thereof; $R_{49}$ is hydrogen or fluoro; X is 5',6'-dihydro-2H-pyran-4'-yloxy; $X_3$ is keto,

wherein $R_{50}$ is X, hydrogen, hydroxy, or conventional hydrolyzable esters thereof; $X_4$ is X, hydroxy, or conventional hydrolyzable esters thereof; and at least one of $X_3$ and $X_4$ in Formulas II, III, and IV is X; $Z_4$ and $Z_6$ each is a single bond or double bond; and $Z_5$ is a single bond, double bond, or a single bond in combination with a methylene group having the formula

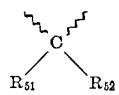

wherein $R_{51}$ and $R_{52}$ each is hydrogen, chloro, or fluoro.

The term progestational steroid is used herein to denote those steroids having progestational activity. The preferred progestational steroids have 5',6'-dihydro-2H-pyran-4'-yl ether groups at positions C-3, C-17β, or C-3,17β of the steroid nucleus.

The compounds represented by Formulas I-V, inclusive, are progestational agents useful in the treatment of menstrual disorders and fertility control and can be used in the same manner as 17α-acetoxy-6-chloropregna-4,6-diene-3,20-dione (chloromadinone acetate). The 16-methylene species are particularly useful in estrus synchronization in domestic animals. These compounds are administered by the usual routes, whether orally or parenterally, either alone or in conjunction with other medicinal agents, or in pharmaceutically acceptable, non-toxic compositions formed by the incorporation of any of the normally employed excipients.

The term "(lower)alkyl" and derivations thereof appearing in the above definitions and elsewhere in the instant specification denote alkyl groups containing from one to six carbon atoms, inclusive, such as methyl, ethyl, propyl, isopropyl, butyl, isobutyl, t-butyl, pentyl, amyl, hexyl, and the like.

The term "conventional hydrolyzable ester" as used herein denotes those hydrolyzable ester groups conventionally employed in the steroid art, preferably those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta,\beta$-dimethylglutarate, acetoxyacetate, 2 - chloro - 4 - nitro - benzoate, aminoacetate, diethylaminoacetate, piperidinoacetate, $\beta$-chloropropionate, trichloroacetate, $\beta$-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

The term "aryl" is included aryl, aralkyl, and alkaryl groups, such as phenyl, p-chlorophenyl, p-methoxyphenyl, benzyl, phenethyl, tolyl, ethylphenyl, and the like. The wavy line ($\S$) designates and includes both the alpha and beta configurations.

The novel 17$\beta$-(5',6'-dihydro-2H-pyran-4'-yloxy) ethers of Formula I and 3$\beta$-(5',6'-dihydro-2H-pyran-4'-yloxy) ethers of Formula V can be prepared from the corresponding respective 17$\beta$-hydroxy and 3$\beta$-hydroxy compounds as shown by the following:

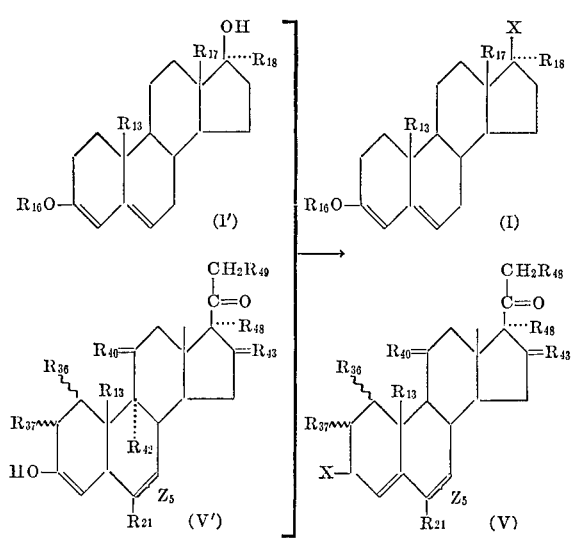

wherein $R_{13}$, $R_{16}$, $R_{17}$, $R_{18}$, $R_{21}$, $R_{36}$, $R_{37}$, $R_{40}$, $R_{42}$, $R_{43}$, $R_{48}$, $R_{49}$, X and $Z_5$ have the meanings indicated above with respect to Formulas I and V.

In carrying out the above illustrated process, the 17$\beta$-hydroxy compounds of Formula I' are reacted under substantially anhydrous conditions with an excess of 4'-(lower)alkoxy-5',6'-dihydro-2H-pyran; for example, with from about two to about 50 or more molecular equivalents for each hydroxyl group in the steroid starting material, in the presence of a small amount of an acidic catalyst, such as hydrochloric acid, p-toluenesulfonic acid, boron trifluoride etherate, and the like, either alone or together with an inert, organic solvent, such as benzene, diethyl ether, methylene chloride, or the like, at a temperature ranging from about 0° C. to about 80° C. (preferably at around room temperature, i.e., 25° C.) for about five minutes to about 48 hours, thus giving the corresponding 17$\beta$-(5',6'-dihydro-2H-pyran-4'-yloxy) ethers represented by Formula I.

The 3$\beta$ - (5',6'-dihydro-2H-pyran-4'-yloxy) ethers of Formula V are prepared by reacting the 3$\beta$-hydroxy compounds of Formula V' under anhydrous conditions with 4' - (lower) - alkoxy-5',6'-dihydro-2H-pyran in the presence of an inorganic solvent, such as benzene, diethyl ether, methylene chloride and the like, and in the presence of a catalytic amount of a stable sulfonyl chloride, such as p-toluenesulfonyl chloride, benzenesulfonyl chloride, methanesulfonyl chloride, p-nitrobenzenesulfonyl chloride, and the like, at temperatures of from 0° C. to 80° C. (preferably at room temperature) for from five minutes to 48 hours.

In carrying out these reactions, a second series of ethers corresponding to those represented by Formulas I–V, inclusive, but wherein X is a 4'-(lower)alkoxytetrahydro-4'-yloxy group are also formed. Use of hydrocarbon solvents for the reaction medium, higher catalyst concentrations, and longer reaction times increase the yield of the 5,6'-dihydro-2H-pyran-4'-yloxy compounds.

The starting materials represented by Formula I' are known in the art or are obtainable by known methods from known steroids. See, for example, U.S. Pat. No. 3,067,214.

The starting materials represented by Formula V' are known in the art or are obtainable from known steroids by known methods. See, for example, U.S. Pat. No. 3,365,446. The Formula V' steroids are obtained from the 3-keto precursor steroids by reduction of the 3-keto group such as with lithium tri-t-butoxy aluminum hydride, lithium trimethoxy aluminum hydride, and the like in an inert, organic solvent, such as tetrahydrofuran, ether, monoglyme, and the like, at a temperature of from room temperature for rapidly reduced compounds up to reflux conditions for compounds exhibiting lower rates of reduction.

The 3-keto precursor steroids for the above elaboration are prepared by processes described in U.S. Pat. 3,338,928 and Ser. No. 499,092, filed Oct. 20, 1965. One particularly useful and novel class of precursors are the 1,2 - methylene-6,7-difluoromethylene-17$\alpha$-acyloxypregn-4-en-3-ones and the corresponding 17$\alpha$-hydroxy and 17$\alpha$-deshydroxy derivatives thereof, the preparation of which is described in detail hereinafter.

The methyleneation reaction hereof by which a halomethylene group is added in at least one of positions C–1,2 and C–6,7 involves treatment of a conjugated unsaturated steroid with a molar excess of an alkali or alkaline earth metal salt of a haloacetic acid, such as bromodichloroacetic acid, trichloroacetic acid, dichlorofluoroacetic acid, difluorochloroacetic acid, and the like.

It is preferable to conduct this reaction after certain labile substituents, such as hydroxy groups, have been protected. This protection is preferably accomplished by converting them to esters, tetrahydropyranyl ethers, or ketones which groups readily facilitate the regeneration of the hydroxyl. This preference is not an absolute necessity, however, for while free hydroxy groups will often become involved in side reactions under the conditions of the process, they can be readily regenerated by execution of a mild hydrolysis after completion of the reaction.

The fused methylene group is introduced by reaction of the unsaturated steroid with dimethylsulfoxonium methylide base in dimethylsulfoxide. Alternatively, reductive dehalogenation of the halomethylene group, inserted via the methyleneation reaction described above, such as with lithium aluminum hydride affords the fused methylene group in lieu thereof.

The conjugated unsaturated starting steroid may be prepared in a number of ways. For example, in the introduction of a double bond between carbons 1 and 2, the A ring of the 3-keto-20-ethylenedioxy-$\Delta^4$ compound is first reduced with lithium metal in liquid ammonia providing the 3-keto-5α-pregnane (allopregnane). Upon treatment of the allopregnane thus obtained with bromine, sodium acetate, and p-toluenesulfonic acid, the 2-bromo-3-keto-5α-pregnane is obtained which is dehydrobrominated with calcium carbonate in dimethylacetamide to afford the $\Delta^1$-unsaturated derivative. Thereafter, the corresponding 1,2-halomethylene derivative or, alternatively, the 1,2-methylene derivative is prepared as described hereinbefore. The introduction of a double bond between carbons 4 and 5 results from a sequence of bromination followed by dehydrobromination as described above. The $\Delta^{4,6}$-diene system is provided by treating the 1,2-substituted-3-keto-4-ene with chloranil in the presence of ethylacetate and acetic acid. The 20-ethylenedioxy protecting group is removed with p-toluenesulfonic acid in ethanol at room temperature, yielding the 20-keto group. Thus, for example, the 1,2-methylenepregn-4-en-3-ones and 1,2-methylenepregna-4,6-dien-3-ones of this invention are prepared as well as the 1,2-halomethylene derivatives thereof.

To provide a 6,7-halomethylene or -methylene substituent, a 3-keto-4,6-diene system is first generated, such as by treating the corresponding 3-keto-4-ene with chloranil in the presence of ethylacetate and acetic acid, as described above, followed by introduction of the C–6,7 substituent as described above thus giving the 3-keto-4-ene containing a 6,7-halomethylene or -methylene group, i.e., the 6,7-halomethylenepregn-4-en-3-ones and 6,7-methylenepregn-4-en-3-ones.

The halomethylene or methylene group may similarly be inserted at position C–6,7 in a 1,2-substituted-3-keto-4,6-diene which is provided via the procedure outlined above. Thus obtained are the 1,2;6,7-bis(halomethylene)-pregn-4-en-3-ones and the corresponding methylene derivatives thereof.

The addition of the methylene and halomethylene groups in accordance with the procedures set forth herein at either of positions C–1,2 and C–6,7 is accomplished with the orientation of the resultant fused grouping including both isomeric alpha and beta configurations in variable ratios. The isomeric product mixture in each instance is conveniently and readily subjected to conventional techniques, such as chromatography, fractional crystallization, and the like, by which the alpha and beta isomers are separated by virtue of their different physical properties. Each isomer can thereafter be subjected to further elaboration at other parts of the molecule.

In some instances, one particular configurational isomer predominates in the reaction mixture. Thus, for example, C–1,2 additions of either the methylene or halomethylene group usually favor the alpha isomer. The presence of an 11β-hydroxyl orients the C–6,7 methylene predominantly to the beta configuration, but does not alter the usual alpha to beta ratio in the halomethylene series. Beta addition in the halomethylene series is favored by the presence of a 9α-halo substituent.

The substituents represented by $R_{13}$ and $R_{21}$ are preferably present in the starting steroids of Formula V' although the 6-halo groups may be introduced by converting the 3-keto-4-ene to its enol ether, such as by treatment with ethyl orthoformate and treating the thus prepared enol ether intermediate with N-chlorosuccinimide or perchloryl fluoride, respectively, yielding a 3-keto-4,6-diene containing a 6-chloro or 6-fluoro group.

The enol ether may also be treated with N-bromo-succinimide and the resultant 6-bromo compound then dehydrobrominated with calcium oxide to yield the 3-keto-4,6-diene. This upon treatment with chromyl chloride yields the 6,7-chlorohydrin which, when subjected to the action of hydrogen bromide in acetic acid, affords the 3-keto-6-chloro-4,6-diene.

The substituents represented and defined by $R_{40}$ and $R_{42}$ may be present in the starting steroid or they may be subsequently introduced via conventional procedures. Thus, an 11β-hydroxy compound is dehydrated to yield the 9(11)-ene. This compound is converted to the 9β,11β-oxido through the bromohydrin intermediate. Treatment of the oxido compound with hydrogen fluoride or hydrogen chloride then yields the 9α-fluoro-11β-hydroxy or 9α-chloro-11β-hydroxy compounds. Alternatively, the 9(11)-ene is treated with chlorine to yield the 9α,11β-dichloro derivative.

The substituents represented by $R_{43}$ and $R_{48}$ are present in the starting steroid. 16α,17α-acetals and -ketals are prepared through treatment of a 16α,17α-dihydroxy compound with an aldehyde or ketone in the presence of an acid, such as perchloric acid. The resultant acetal or ketal, for example, a 16α,17α-isopropylidenedioxy derivative may be utilized as a final compound or as an intermediate, the group being cleaved with regeneration of the diol by the action of hydrofluoric acid.

The 16-methylene group is present in the starting steroid and can be introduced as disclosed in U.S. Pat. 3,262,950 from a 16-methylpregna-4,16-diene-3,20-dione or 16-methyl-19-norpregna-4,16-diene-3,20-dione. The C–16,17 double bond is selectively epoxidized with hydrogen peroxide, for example, in a lower alkanol or other solvent, to form the 16α,17α-oxido group which is then cleaved to form the 16-methylene-17α-hydroxy or -acetoxy derivative in a solvent of a mineral acid or acetic anhydride, respectively, in a solvent of low ionizing power, such as benzene.

The substituents represented by $R_{49}$ are present in the starting steroid and can be introduced as described in U.S. Pat. 3,262,950. For example, the 21-unsubstituted compound can be reacted with iodine in the presence of calcium oxide and methanol in tetrahydrofuran to form the 21-iodo intermediate which is then reacted with silver fluoride, for example, to form the 21-fluoro derivative.

The 4'-(lower)alkoxy-5',6'-dihydro-2H-pyran reactants used to form the ethers of this invention can be prepared by well-known methods. For example, tetrahydro-4-pyrone can be reacted with a primary or secondary lower alkanol under acidic conditions to form the intermediate, 4',4'-di(lower)alkoxytetrahydropyran, which upon distillation with an acid, such as toluenesulfonic acid or mesitylenesulfonic acid, yields the 4'-(lower)alkoxy-5',6'-dihydro-2H-pyran product. Such a method is described by Reese et al., J. Am. Chem. Soc, 89, 3367 (1967). The lower alkanol is preferably methanol but it can be other lower alcohols, such as ethanol, propanol, isopropanol, butanol, isobutanol, pentanol, amyl alcohol, hexanol, and the like, to form the corresponding pyrans, such as, for example, 4'-methoxy-5',6'-dihydro-2H-pyran, 4'-ethoxy-5,6'-dihydro-2H-pyran, etc.

The 3-, 17β-, and 3,17β-bis(5',6'-dihydro-2H-pyran-4'-yloxy) ethers represented by Formulas II, III, and IV can be prepared from the corresponding androsten-17β-ol-3-one and 19-norandrosten-17β-ol-3-one compounds by a process which can be illustrated schematically as follows for the compounds of Formula II.

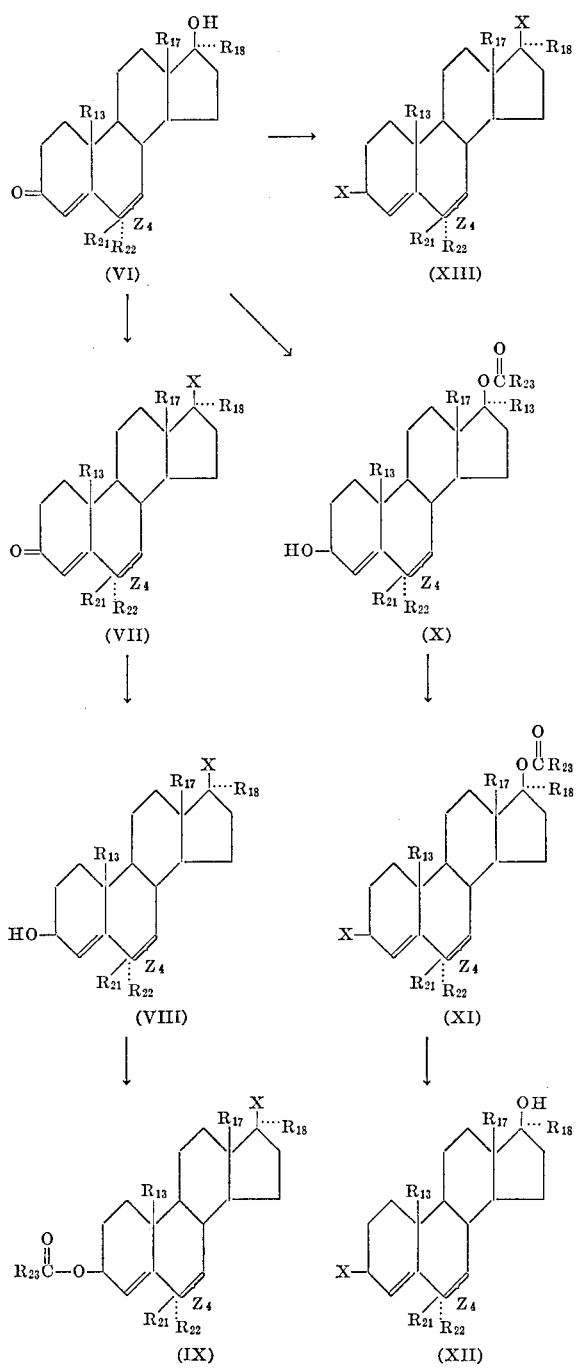

In these formulas, $R_{13}$, $R_{17}$, $R_{18}$, $R_{21}$, $R_{22}$, $Z_4$, and X have the meanings given with respect to Formulas I–V above, and $R_{23}$ is an alkyl, alkenyl, cycloalkenyl, or cycloalkyl group having up to 12 carbon atoms.

In carrying out the above-illustrated process, 17α-ethynylandrost-4-en-17β-ol-3-one, for example (VI: $R_{13}$ and $R_{17}$=methyl; $R_{18}$=ethynyl; and $R_{21}$ and $R_{22}$=hydrogen) is reacted under substantially anhydrous conditions with an excess of 4′-(lower)alkoxy-5′,6′-dihydro-2H-pyran as described above with respect to Formula I to give the corresponding 17α-ethynyl-17β-(5′,6′-dihydro-2H-pyran-4′-yloxy)androst-4-en-3-one (VII). This compound can be converted to the 3β-hydroxy derivative by dissolving it in an inert solvent such as a (lower)alkanol, such as methanol, an ether, such as dioxane or tetrahydrofuran or the like, and reacting it under neutral conditions with a metal hydride, such as lithium aluminum hydride, sodium borohydride, and the like, at temperatures ranging from room temperature to reflux temperature for from about one hour to about 24 hours, thus giving the corresponding 17α-ethyny 1- 17β - (5′,6′-dihydro-2H-pyran-4′-yloxy)androst-4-en-3β-ol (VIII). To obtain the 3β-ester of Formula IX, the product can be reacted with an organic acid anhydride in pyridine or with a solution of ethylmagnesium bromide and the desired organic chloride in anhydrous ether; for example, reaction with acetic anhydride yields 3β-acetoxy-17α-ethynyl-17β-(5′,6′-dihydro-2H-pyran-4′-yloxy)androst4-ene (IX: $R_{23}$=methyl). By this procedure, the compounds represented by Formulas VII–IX, inclusive, are obtained with other androst-4-en-17β-ol-3-ones wherein $R_{13}$ is hydrogen or methyl; $R_{17}$ is ethyl or methyl; $R_{18}$ is lower alkenyl, lower alkynyl, lower haloalkynyl, and

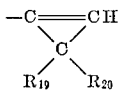

wherein $R_{19}$ and $R_{20}$ each is hydrogen, chloro, or fluoro; and $R_{21}$ and $R_{22}$ each is hydrogen, methyl, fluoro, or chloro.

In carrying out the above-illustrated process to form the 3β-(5′,6′-dihydro-2H-pyran-4′-yloxy) ethers of Formulas XI and XII from the compounds represented by Formula VI, the keto group at C–3 is first reduced to 3β-hydroxy such as by reaction with lithium tri-t-butoxy aluminum hydride or lithium aluminum hydride as described above with respect to Formula VIII to yield, for example, 17α-ethynylandrost-4-ene-3β,17β-diol. The product is then esterified with one molar equivalent of acetic anhydride by procedures described with respect to Formula IX to form a mixture of mono-esters. The 17β-acetoxy compounds are separated from the mixture by conventional chromatographic techniques. For example, 17α-ethylnylandrost - 4 - en-17β-ol-3-one (VI: $R_{13}$ and $R_{17}$=methyl; $R_{18}$=ethynyl; and $R_{21}$ and $R_{22}$=hydrogen) is reduced to 16α-ethynylandrost-4-ene-3β,17β-diol and the product is esterified to form 17α-ethylnyl-17β-acetoxyandrost-4-en-3β-ol (X). This compound is then reacted with 4′-(lower)alkoxy-5′,6′-dihydro-2H-pyran as described above with respect to Formula VII to yield the corresponding 3β-ether, for example, 3β-(5′,6′-dihydro-2H-pyran-4′-yloxy) - 17α - ethynyl-17β-acetoxyandrost-4-ene (XI). If the 17β-hydroxy compound as described in Formula XII is desired, the latter product is hydrolyzed by conventional procedures, for example, in a solution of potassium hydroxide in methanol, to yield the desired product, for example 3β - (5′,6′-dihydro-2H-pyran-4′-yloxy)-17α-ethynylandrost-4-en-17β-ol. By this procedure, other 3β - (5′,6′-dihydro-2H-pyran-4′-yloxy) compounds represented by Formulas XI and XII can be prepared from the corresponding compounds of Formula VI wherein $R_{13}$ is hydrogen or methyl; $R_{17}$ is methyl or ethyl; $R_{18}$ is lower alkenyl, lower alkynyl, lower haloalkynyl, and

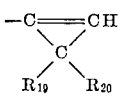

wherein $R_{19}$ and $R_{20}$ each is hydrogen, chloro, or fluoro; and $R_{21}$ and $R_{22}$ each is hydrogen, methyl, fluoro, or chloro.

In the above-illustrated process to make the 3β, 17β-bis(5′,6′-dihydro-2H-pyran-4′-yloxy) ethers represented by Formula XIII, the corresponding 17β-hydroxy-3-keto of Formula VI is first reduced by reaction with a metal hydride, such as lithium tri-t-butoxy aluminum hydride or lithium aluminum hydride, to yield the corresponding 3β-hydroxy compound as described above with respect to the compounds of Formula VIII. The 3β, 17β-dihydroxy compound, for example, 17α-ethynylandrost-4-ene-3β,17β-diol, is then reacted with a molar excess of 4′-(lower)-alkoxy-5′,6′-dihydro-2H-pyran as described above with respect to Formula VII to yield the corresponding 3β, 17β-bis-(5',6'-dihydro-2H-pyran-4'-yloxy) ether, such as, for example, 3β,17β-bis(5',6'-dihydro-2H-pyran-4'-yloxy)-17α-ethynylandrost-4-ene. By this procedure, other compounds represented by Formula XIII, wherein $R_{13}$, $R_{17}$, $R_{18}$, $R_{21}$, $R_{22}$ and X are as defined above, can be obtained from the corresponding substituted compounds represented by Formula VI.

By the above-illustrated procedures, the 3β-, 17β-, and 3,17β-bis(5',6'-dihydro-2H-pyran-4'-yloxy) - 19 - norandrost-5(10)-enes and -19-norandrosta-4,9(10)-dienes represented by Formulas III and IV, respectively, can be prepared from the corresponding 19-norandrost-5(10)-en-17β-ol-3-ones and 19-norandrosta-4,9(10)-dien-17β-ol-3-ones.

In preparing the ethers of Formula II, and the substituents $R_{13}$, $R_{17}$, $R_{18}$, $R_{21}$, and $R_{22}$ are present in the known starting compounds. See, for example, JACS, 80, 4717 (1958); JACS, 83, 4663 (1961); J. Pharm. Pharmacol, 9, 929 (1957); Ber., 71, 1024 (1938); Endocrinology, 65, 265 (1959); and U.S. Pats. 3,028,401, 3.047,592, 3,052,693, and 3,067,214.

In preparing the ethers of Formula III, the substituents $R_{17}$ and $-C \equiv CR_{25}$ are also present in the known starting compounds. See, for example, JACS, 83, 4663 (1961) and Endocrinology, 65, 265 (1959).

In preparing the ethers of Formula IV, the substituents $R_{17}$ and $R_{18}$ are also present in the known starting compound. See, for example, JACS, 83, 4663 (1961), J. Chem. Soc., 4472 (1964), and U.S. Pats. 3,086,027, 3,248,294, 3,250,793, and 3,257,278.

Starting materials having an 18-methyl group ($R_{17}$=ethyl) are obtainable by methods described by Smith et al. in Experimentia, vol. 19, pp. 394–396 (1963).

The invention is further illustrated by the following specific but non-limiting examples.

EXAMPLE 1

To a solution of 1 g. of 3-methoxy-17α-ethynylandrosta 3,5-dien-17β-ol and 25 cc. of benzene, there are added 2 cc. of 4'-methoxy-5',6'-dihydro-2H-pyran. Next, approximately 5 cc. of the mixture of benzene and dihydropyran are distilled off to remove moisture, and the remaining mixture is then cooled to room temperature. To the cooled mixture is then added 0.1 g. of p-toluenesulfonic acid, and the resulting reaction mixture is held at room temperature for 72 hours. Following this reaction period, the reaction mixture is washed with an aqueous 5% sodium carbonate solution and then with water until a neutral pH is obtained, then dried over anhydrous sodium sulfate and evaporated to dryness. The dry residue is then chromatographed by passing it, dissolved in hexane, through a column of neutral alumina, thus giving 3 - methoxy - 17α - ethynyl - 17β - (5',6' - dihydro-2H-pyran-4'-yloxy)-androsta-3,5-diene.

EXAMPLE 2

Repeating the procedure of Example 1 but replacing 3-methoxy-17α-ethynyllandrosta-,3,5-dien-17β-ol with 3-methoxy-17α-ethynyl-18-methylandrosta-3,5-dien-17β-ol,
3-propoxy-17α-ethynylandrosta-3,5-dien-17β-ol,
3-cyclopropoxy-17α-ethynylandrosta-3,5-dien-17β-ol,
3-ethoxy-17α-ethynylandrosta-3,5-dien-17β-ol,
3-cyclopentoxy-17α-ethynylandrosta-3,5-dien-17β-ol,
3-cyclobutoxy-17α-ethynylandrosta-3,5-dien-17β-ol,
3-methoxy-17α-methylethynylandrosta-3,5-dien-17β-ol,
3-methoxy-17α-fluoroethynylandrosta-3,5-dien-17β-ol,
3-methoxy-17α-chloroethynylandrosta-3,5-dien-17β-ol,
3-methoxy-17α-ethynyl-19-norandrosta-3,5-dien-17β-ol,
3-cyclopentoxy-17α-ethynyl-19-norandrosta-3,5-dien-17β-ol,
3-cyclopentoxy-17α-ethynyl-18-methyl-19-norandrosta-3,5-dien-17β-ol,
3-methoxy-17α-ethynyl-18-methyl-19-norandrosta-3,5-dien-17β-ol,
3-ethoxy-17α-ethynyl-18-methyl-19-norandrosta-3,5-dien-17β-ol,
3-methoxy-17α-vinyl-18-methyl-19-norandrosta-3,5-dien-17β-ol, and
3-methoxy-17α(2'',2''-difluorocyclopropenyl)-18-methyl-19-norandrosta-3,5-dien-17β-ol, the following products are obtained:

3-methoxy-17α-ethynyl-17β-(5',6'-dihydro-2H-pyran-4'-yloxy)-18-methylandrosta-3,5-diene,
3-propoxy-17α-ethynyl-17β-(5',6'-dihydro-2H-pyran-4'-yloxy)androsta-3,5-diene,
3-cyclopropoxy-17α-ethynyl-17β-(5',6'-dihydro-2H-pyran-4'-yloxy)androsta-3,5-diene,
3-ethoxy-17α-ethynyl-17β-(5',6'-dihydro-2H-pyran-4'-yloxy)androsta-3,5-diene,
3-cyclopentoxy-17α-ethynyl-17β-(5',6'-dihydro-2H-pyran-4'-yloxy)androsta-3,5-diene,
3-cyclobutoxy-17α-ethynyl-17β-(5',6'-dihydro-2H-pyran-4'-yloxy)androsta-3,5-diene,
3-methoxy-17α-methylethynyl-17β-(5',6'-dihydro-2H pyran-4'-yloxy)androsta-3,5-diene,
3-methoxy-17α-fluoroethynyl-17β-(5',6'-dihydro-2H-pyran-4'-yloxy)androsta-3,5-diene,
3-methoxy-17α-chloroethynyl-17β-(5',6'-dihydro-2H-pyran-4'-yloxy)androsta-3,5-diene,
3-methoxy-17α-ethynyl-17β-(5',6'-dihydro-2H-pyran-4'-yloxy)-19-norandrosta-3,5-diene,
3-cyclopentoxy-17α-ethynyl-17β-(5',6'-dihydro-2H-pyran-4'-yloxy)19-norandrosta-3,5-diene,
3-cyclopentoxy-17α-ethynyl-17β-(5',6'-dihydro-2H-pyran-4'-yloxy)-18-methyl-19-norandrosta-3,5-diene,
3-methoxy-17α-ethynyl-17β-(5',6'-dihydro-2H-pyran-4'-yloxy)-18-methyl-19-norandrosta-3,5-diene,
3-ethoxy-17α-ethynyl-17β-(5',6'-dihydro-2H-pyran-4'-yloxy)-18-methyl-19-norandrosta-3,5-diene,
3-methoxy-17α-vinyl-17β-(5',6'-dihydro-2H-pyran-4'-yloxy)-18-methyl-19-norandrosta-3,5-diene, and
3-methoxy-17α(2'',2''-difluorocyclopropenyl)-17β-(5',6'-dihydro-2H-pyran-4'-yloxy)18-methyl-19-norandrosta-3,5-diene.

EXAMPLE 3

Two milliliters of 4'-methoxy-5',6'-dihydro-2H-pyran are added to a solution of 1 g. of pregn-4-en-3β-ol-20-one in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-(5',6'-dihydro-2H-pyran-4'-yloxy)pregn-4-en - 20 - one which is recrystallized from pentane.

EXAMPLE 4

Repeating the procedure of Example 3 but replacing pregn-4-en-3β-ol-20-one with 6-chloro-17α-acetoxypregna-4,6-dien-3β-ol-20-one,
6-chloro-17α-acetoxy-19-norpregna-4,6-dien-3β-ol-20-one,
1α,2α-methylene-6-chloro-17α-acetoxypregna-4,6-dien-3β-ol-20-one,
6-methyl-17α-acetoxypregna-4,6-dien-3β-ol-20-one,
6-methyl-17α-acetoxy-19-norpregna-4,6-dien-3β-ol-20-one,
6-chloro-16-methylene-17α-acetoxypregna-4,6-dien-3β-ol-20-one,
6α-chloro-16-methylene-17α-acetoxypregn-4-en-3β-ol-3β-ol-20-one,
6α-chloro-16-methylene-17α-acetoypregn-4-en-3β-ol-20-one,
6β-chloro-16-methylene-17α-acetoxypregn-4-en-3β-ol-20-one, 6α-methyl-16-methylene-17α-acetoxypregn-4-en-3β-ol-
20-one,
6β-methyl-16-methylene-17α-acetoxypregn-4-en-3β-ol-
20-one,
16α,17α-isopropylidenedioxypregn-4-en-3β-ol-20-one,
6α-fluoro-16α-methylpregn-4-en-3β-ol-20-one,
6β-fluoro-16α-methylpregn-4-en-3β-ol-20-one,
6α-fluoro-16β-methylpregn-4-en-3β-ol-20-one,
6β-fluoro-16β-methylpregn-4-en-3β-ol-20-one,
16α,17α-methylphenylmethylenedioxypregn-4-en-3β-ol-
20-one,
6β-fluoro-6α,7α-difluoromethylene-17α-acetoxypregn-4-
en-3β-ol-20-one,
6α-fluoro-17α-acetoxypregn-4-en-3β-ol-20-one,
6,9α,11β-trichloro-17α-acetoxypregna-4,6-dien-3β-ol-
20-one,
6-chloro-9α-fluoro-17α-acetoxypregna-4,6-dien-3β,11β-
diol-20-one,
6-chloro-17α-caproyloxypregna-4,6-dien-3β-ol-20-one,
6α-methylpregn-4-en-3β-ol-11,20-dione,
9α,11β-dichloropregn-4-en-3β-ol-20-one,
9α-fluoropregn-4-en-3β,11β-diol-20-one,
6-methylpregna-4,6-dien-3β-ol-11,20-dione,
6-methyl-17α-acetoxypregna-4,6-dien-3β-ol-11,20-dione,
6α,16α-dimethylpregn-4-en-3β-ol-20-one, and
pregn-4-en-3β-ol-11β,20-dione, the following products are obtained:

3β-(5′,6′-dihydro-2H-pyran-4′-yloxy)-6-chloro-17α-
acetoxypregna-4,6-dien-20-one,
3β-(5′,6′-dihydro-2H-pyran-4′-yloxy)-6-chloro-17α-
acetoxy-19-norpregna-4,6-dien-20-one,
1α,2α-methylene-3β-(5′,6′-dihydro-2H-pyran-4′-yloxy)-
6-chloro-17α-acetoxypregna-4,6-dien-20-one,
3β-(5′,6′-dihydro-2H-pyran-4′-yloxy)-6-methyl-17α-
acetoxypregna-4,6-dien-20-one,
3β-(5′,6′-dihydro-2H-pyran-4′-yloxy)-6-methyl-17α-
acetoxy-19-norpregna-4,6-dien-20-one,
3β-(5′,6′-dihydro-2H-pyran-4′-yloxy)-6-chloro-16-
methylene-17α-acetoxypregna-4,6-dien-20-one,
3β-(5,6′-dihydro-2H-pyran-4′-yloxy)-6-methyl-16-
methylene-17α-acetoxypregna-4,6-dien-20-one,
3β-(5′,6′-dihydro-2H-pyran-4′-yloxy)-6α-chloro-16-
methylene-17α-acetoxypregn-4-en-20-one,
3β-(5′,6′-dihydro-2H-pyran-4′-yloxy)-6β-chloro-16-
methylene-17α-acetoxypregn-4-en-20-one,
3β-(5′,6′-dihydro-2H-pyran-4′-yloxy)-6α-methyl-16-
methylene-17α-acetoxypregn-4-en-20-one,
3β-(5′,6′-dihydro-2H-pyran-4′-yloxy)-6β-methyl-16-
methylene-17α-acetoxypregn-4-en-20-one,
3β-(5′,6′-dihydro-2H-pyran-4′-yloxy)-16α,17α-iso-
propylidenedioxypregn-4-en-20-one,
3β-(5′,6′-dihydro-2H-pyran-4′-yloxy)-6α-fluoro-16α-
methylpregn-4-en-20-one,
3β-(5′,6′-dihydro-2H-pyran-4′-yloxy)-6β-fluoro-16α-
methylpregn-4-en-20-one,
3β-(5′,6′-dihydro-2H-pyran-4′-yloxy)-6α-fluoro-16β-
methylpregn-4-en-20-one,
3β-(5′,6′-dihydro-2H-pyran-4′-yloxy)-6β-fluoro-16β-
methylpregn-4-en-20-one,
3β-(5′,6′-dihydro-2H-pyran-4′-yloxy)-16α,17α-methyl-
phenylmethylenedioxypregn-4-en-20-one,
3β-(5′,6′-dihydro-2H-pyran-4′-yloxy)-6β-fluoro-6α,7α-
difluoromethylene-17α-acetoxypregn-4-en-20-one,
3β-(5′,6′-dihydro-2H-pyran-4′-yloxy)-6α-fluoro-17α-
acetoxypregn-4-en-20-one,
3β-(5′,6′-dihydro-2H-pyran-4′-yloxy)-6,9α,11β-
trichloro-17α-acetoxypregna-4,6-dien-20-one,
3β-(5′,6′-dihydro-2H-pyran-4′-yloxy)-6-chloro-9α-
fluoro-17α-acetoxypregna-4,6-dien-11β-ol-20-one,
3β-(5′,6′-dihydro-2H-pyran-4′-yloxy)-6-chloro-17α-
caproyloxypregna-4,6-dien-20-one,
3β-(5′,6′-dihydro-2H-pyran-4′-yloxy)-6α-methylpregn-
4-en-11,20-dione,
3β-(5′,6′-dihydro-2H-pyran-4′-yloxy)-9α,11β-dichloro-
pregn-4-en-3β-ol-20-one,
3β-(5′,6′-dihydro-2H-pyran-4′-yloxy)-9α-fluoropregn-
4-ene-3β,11β-diol-20-one,
3β-(5′,6′-dihydro-2H-pyran-4′-yloxy)-6-methylpregna-
4,6-dien-3β-ol-11,20-dione,
3β-(5′,6′-dihydro-2H-pyran-4′-yloxy)-6-methyl-17α-
acetoxypregna-4,6-dien-3β-ol-11,20-dione,
3β-(5′,6′-dihydro-2H-pyran-4′-yloxy)-6α,16α-dimethyl-
pregn-4-en-20-one, and
3β-(5′,6′-dihydro-2H-pyran-4′-yloxy)pregn-4-en-11,20-
dione.

EXAMPLE 5

Repeating the procedure of Example 3 with other
pregn-4-en-3β-ol-20-ones and 19-norpregn-4-en-3β-ol-20-
ones having at position C–6, hydrogen, methyl, fluoro, and
chloro groups (both α and β oriented when the C–6,7
bond is a single bond); at position C–9α, hydrogen,
chloro, or fluoro (hydrogen for 19-nor compounds);
at position C–11, keto or in the β-orientation—hydrogen,
chloro, and hydroxy (hydrogen for 19-nor compounds);
at C–16, methylene, hydrogen, α-methyl, β-methyl; at
C–16α,17α, methylenedioxy, isopropylidenedioxy, ethyl-
phenylmethylenedioxy; at C–17α, hydrogen, hydroxy, and
acetoxy; at C–21, hydrogen or fluoro; at each of C–1,2
and C–6,7, a single bond, double bond, or methylene,
methylmethylene, dimethylmethylene, dichloromethylene,
chloromethylene, difluoromethylene, and fluoromethylene
group—the corresponding 3β-(5′,6′-dihydro-2H-pyran-4′-
yloxy)pregn-4-en-20-ones are obtained e.g., 3β-(5′,6′-dihydro-2H-pyran-4′-yloxy)pregna-1,4-dien-
20-one,
1α,2α-methylene-3β-(5′,6′-dihydro-2H-pyran-4′-yloxy)-
6α-methylpregn-4-en-20-one,
1α,2α-difluoromethylene-3β-(5′,6′-dihydro-2H-pyran-4′-
yloxy)-6α-chloropregn-4-en-20-one,
1β,2β-isopropylidene-3β-(5′,6′-dihydro-2H-pyran-4′-
yloxy)-6α,9α-difluoropregn-4-en-20-one,
3β-(5′,6′-dihydro-2H-pyran-4′-yloxy)-11β-hydroxy-
pregn-4-en-20-one,
3β-(5′,6′-dihydro-2H-pyran-4′-yloxy)-11β-hydroxy-
pregna-4,6-dien-20-one,
3β-(5′,6′-dihydro-2H-pyran-4′-yloxy)-6α,16α-dimethyl-
9α-fluoro-17α-valeroxypregna-4,6-dien-20-one, etc.

EXAMPLE 6

Repeating the procedure of Example 1 but replacing 3-
methoxy-17α-ethynylandrosta-3,5-dien-17β-ol with 17α-
ethynyl - 19 - norandrost-4-en-17β-ol-3-one—17α-ethynyl-
17β-(5′,6′-dihydro - 2H - pyran-4′-yloxy)-19-norandrost-4-
en-3-one is obtained.

Similarly, repeating this procedure with other 19-nor-
androst - 4-en-17β-ol-3-ones, androst-4-en-17β-ol-3-ones,
19-norandrosta-4,6-dien-17β-ol-3-ones, and androsta-4,6-
dien-17β-ol-3-ones having hydrogen, methyl, chloro, or
fluoro groups at the C–6α and/or C–6β position (or at
the C–6 position for the 4,6-dienes); hydrogen or methyl
at C–18; and ethynyl, vinyl, methylethynyl, chloroethynyl,
fluoroethynyl, or 2″,2‴-difluorocyclopropenyl groups at
C–17α yields the corresponding 17β-(5′,6′-dihydro-2H-
pyran-4′-yloxy) compounds, e.g., 17α-ethynyl-17β-(5′,6′-dihydro-2H-pyran-4′-yloxy)-18-
methyl-9-norandrost-4-en-3-one,
6α-chloro-17α-ethynyl-17β-(5′,6′-dihydro-2H-pyran-
4′-yloxy)-19-norandrost-4-en-3-one,
6α-chloro-17α-ethynyl-17β-(5′,6′-dihydro-2H-pyran-
4′-yloxy)-18-methyl-19-norandrost-4-en-3-one,
6α-fluoro-17α-ethynyl-17β-(5′,6′-dihydro-2H-pyran-
4′-yloxy)-19-norandrost-4-en-3-one,
6α-fluoro-17α-ethynyl-17β-(5′,6′-dihydro-2H-pyran-
4′-yloxy)-18-methyl-19-norandrost-4-en-3-one,
6α-methyl-17α-ethynyl-17β-(5′,6′-dihydro-2H-pyran-
4′-yloxy)-19-norandrost-4-en-3-one, 6α-methyl-17α-ethynyl-17β-(5',6'-dihydro-2H-pyran-
4'-yloxy)-18-methyl-19-norandrost-4-en-3-one,
6β-methyl-17α-ethynyl-17β-(5',6'-dihydro-2H-pyran-
4'-yloxy)-19-norandrost-4-en-3-one,
6β-chloro-17α-ethynyl-17β-(5',6'-dihydro-2H-pyran-
4'-yloxy)-19-norandrost-4-en-3-one,
6β-fluoro-17α-ethynyl-17β-(5',6'-dihydro-2H-pyran-
4'-yloxy)-19-norandrost-4-en-3-one,
6α,6β-difluoro-17α-ethynyl-17β-(5',6'-dihydro-2H-pyran-
4'-yloxy)-19-norandrost-4-en-3-one,
6α-methyl-17α-methylethynyl-17β-(5',6'-dihydro-2H-
pyran-4'-yloxy)-19-norandrost-4-en-3-one,
17α-methylethynyl-17β-(5',6'-dihydro-2H-pyran-4'-
yloxy)-19-norandrost-4-en-3-one,
17α-chloroethynyl-17β-(5',6'-dihydro-2H-pyran-4'-
yloxy)-19-norandrost-4-en-3-one,
17α-fluoroethynyl-17α-(5',6'-dihydro-2H-pyran-4'-
yloxy)-19-norandrost-4-en-3-one,
6α-methyl-17α-fluoroethynyl-17β-(5',6'-dihydro-2H-pyran-
4'-yloxy)-18-methyl-19-norandrost-4-en-3-one,
17α-ethynyl-17β-(5',6'-dihydro-2H-pyran-4'-yloxy)-
androst-4-en-3-one,
17α-ethynyl-17β-(5',6'-dihydro-2H-pyran-4'-yloxy)-
18-methylandrost-4-en-3-one,
6α-chloro-17α-ethynyl-17β-(5',6'-dihydro-2H-pyran-4'-
yloxy)androst-4-en-3-one,
6α-chloro-17α-ethynyl-17β-(5',6'-dihydro-2H-pyran-
4'-yloxy)-18-methylandrost-4-en-3-one,
6α-fluoro-17α-ethynyl-17β-(5',6'-dihydro-2H-pyran-
4'-yloxy)androst-4-en-3-one,
6α-fluoro-17α-ethynyl-17β-(5',6'-dihydro-2H-pyran-
4'-yloxy)-18-methylandrost-4-en-3-one,
6α-methyl-17α-methylethynyl-17β-(5',6'-dihydro-2H-
4'-yloxy)-18-methylandrost-4-en-3-one.
6α-methyl-17α-methylethynyl-17β-(5',6-dihydro-2H-
pyran-4'-yloxy)androst-4-en-3-one,
6α-methyl-17α-ethynyl-17β-(5',6'-dihydro-2H-pyran-
4'-yloxy)-8-methylandrost-4-en-3-one,
6α-methyl-17α-ethynyl-17β-(5',6-dihydro-2H-pyran-
4'-yloxy)-19-norandrosta-4,6-dien-3-one,
6α-methyl-17α-vinyl-17β-(5',6'-dihydro-2H-pyran-4'-
yloxy)-18-methylandrost-4-en-3-one,
6α-methyl-17α-vinyl-17β-(5',6'-dihydro-2H-pyran-4'-
yloxy)-18-methyl-19-norandrosta-4,6-dien-3-one,
6α-methyl-17α-ethynyl-17β-(5',6'-dihydro-2H-pyran-4'-
yloxy)-18-methyl-19-norandrosta-4,6-dien-3-one,
and the like.

EXAMPLE 7

A solution of 1 g. of 17α-ethynyl-17β-(5',6'-dihydro-2H-pyran-4'-yloxy)-19-norandrost-4-en-3-one in 50 ml. of tetrahydrofuran is added over a 30-minute period to a stirred suspension of 1 g. of lithium tri-t-butoxy aluminum hydride in 50 ml. of anhydrous tetrahydrofuran and this mixture is heated at reflux for two hours. To the mixture are cautiously added 5 ml. of ethylacetate and 2 ml. of water. Sodium sulfate is next added, the mixture is filtered, and the solid thus collected is washed with hot ethylacetate. The combined organic solutions are then evaporated to yield 17α-ethynyl-17β-(5',6'-dihydro-2H-pyran-4'-yloxy)-19-norandrost-4-en-3β-ol which may be further purified through recrystallization from acetone: hexane.

Similarly, repeating this procedure with other products of Example 6 yields the corresponding 3β-hydroxy derivatives, e.g., 17α-ethynyl-17β-(5',6'-dihydro-2H-pyran-4'-yloxy)-18-
methyl-19-norandrost-4-en-3β-ol,
6α-chloro-17α-ethynyl-17β-(5',6'-dihydro-2H-pyran-
4'-yloxy)-19-norandrost-4-en-3β-ol,
6α-chloro-17α-ethynyl-17β-(5',6'-dihydro-2H-pyran-
4'-yloxy)-18-methyl-19-norandrost-4-en-3β-ol,
6α-fluoro-17α-ethynyl-17β-(5',6'-dihydro-2H-pyran-
4'-yloxy)-19-norandrost-4-en-3β-ol,
6α-fluoro-17α-ethynyl-17β-(5',6'-dihydro-2H-pyran-
4'-yloxy)-18-methyl-19-norandrost-4-en-3β-ol,
6α-methyl-17α-ethynyl-17β-(5',6'-dihydro-2H-pyran-
4'-yloxy)-19-norandrost-4-en-3β-ol,
6α-methyl-17α-ethynyl-17β-(5',6'-dihydro-2H-pyran-
4'-yloxy)-18-methyl-19-norandrost-4-en-3β-ol,
6β-methyl-17α-ethynyl-17β-(5',6'-dihydro-2H-pyran-
4'-yloxy)-19-norandrost-4-en-3β-ol,
6β-chloro-17α-ethynyl-17β-(5',6'-dihydro-2H-pyran-
4'-yloxy)-19-norandrost-4-en-3β-ol,
6β-fluoro-17α-ethynyl-17β-(5',6'-dihydro-2H-pyran-
4'-yloxy)-19-norandrost-4-en-3β-ol,
6α,6β-difluoro-17α-ethynyl-17β-(5',6'-dihydro-2H-
pyran-4'-yloxy)-19-norandrost-4-en-3β-ol,
6α-methyl-17α-methylethynyl-17β-(5',6'-dihydro-2H-
pyran-4'-yloxy)-19-norandrost-4-en-3β-ol,
17α-methylethynyl-17β-(5',6'-dihydro-2H-pyran-4'-
yloxy)-19-norandrost-4-en-3β-ol,
17α-chloroethynyl-17β-(5',6'-dihydro-2H-pyran-4'-
yloxy)-19-norandrost-4-en-3β-ol,
17α-fluoroethynyl-17β-(5'-6'-dihydro-2H-pyran-4'-
yloxy)-19-norandrost-4-en-3β-ol,
6α-methyl-17α-fluoroethynyl-17β-(5',6'-dihydro-2H-
pyran-4'-yloxy)-18-methyl-19-norandrost-4-en-3β-ol,
17α - ethynyl - 17β - (5',6'-dihydro-2H-pyran-4'-yloxy)-
androst-4-en-3β-ol,
17α - ethynyl - 17β - (5',6'-dihydro-2H-pyran-4'-yloxy)-
18-methylandrost-4-en-3β-ol,
6α - chloro - 17α - ethynyl-17β-(5',6'-dihydro-2H-pyran-
4'-yloxy)androst-4-en-3β-ol.
6α - chloro - 17α - ethynyl-17β-(5',6'-dihydro-2H-pyran-
4'-yloxy)-18-methylandrost-4-en-3β-ol,
6α - fluoro - 17α - ethynyl-17β-(5',6'-dihydro-2H-pyran-
4'-yloxy)androst-4-en-3β-ol,
6α - methyl - 17α - ethynyl-17β-(5',6'-dihydro-2H-pyran-
4'-yloxy)-18-methylandrost-4-en-3β-ol,
6 - methyl - 17 - ethynyl-17β-(5',6'-dihydro-2H-pyran-
4'-yloxy)androst-4-en-3β-ol,
6α - methyl - 17α - ethynyl-17β-(5,6'-dihydro-2H-pyran-
4'-yloxy)-18-methylandrost-4-en-3β-ol,
6α - methyl - 17α - vinyl-17β-(5',6'-dihydro-2H-pyran-4'-
yloxy)-18-methylandrost-4-en-3β-ol,
6α - methyl - 17α - vinyl-17β-(5',6'-dihydro-2H-pyran-4'-
yloxy) - 18 - methyl-18-norandrosta-4,6-dien-3β-ol, and
the like.

EXAMPLE 8

A mixture of 1 g. of 17α-ethynyl-17β-(5',6'-dihydro-2H - pyran - 4'-yloxy)-19-norandrost-4-en-3β-ol, 4 ml. of pyridine, and 2 ml. of acetic anhydride is allowed to stand at room temperature for 15 hours. The mixture is then poured into ice water and the solid which forms is collected by filtration, washed with water, and dried to yield 3β - acetoxy - 17α-ethynyl-17β-(5',6'-dihydro-2H-pyran-4'-yloxy)-19-norandrost-4-ene which may be further purified through recrystallization from acetone:hexane.

Similarly, repeating this procedure with other products of Example 7 yields the corresponding 3β-acetoxy derivatives, e.g., 3β-acetoxy-17α-ethynyl-17β-(5',6'-dihydro-2H-pyran - 4'-yloxy)-18-methyl-19-norandrost-4-ene, 3β-acetoxy - 17α - ethynyl - 17β - (5',6' - dihydro-2H-pyran-4'-yloxy)androst - 4-ene, 3β-acetoxy-17α-ethynyl-17β-(5',6'-dihydro - 2H-pyran-4'-yloxy)-18-methylandrost-4-ene, and the like.

EXAMPLE 9

Repeating the procedure of Example 7 but replacing 17α - ethynyl - 17β - (5',6'-dihydro-2H-pyran-4'-yloxy)-19-norandrost-4-en-3-one with 17α-ethynyl-19-norandrost-4 - en - 17β - ol-3-one—17α-ethynyl-19-norandrost-4-ene-3β,17β-diol is obtained.

A mixture of 1 g. of 17α-ethynyl-19-norandrost-4-ene-3β,17β-diol, 4 ml. of pyridine, and 2 ml. of acetic anhydride is allowed to stand at room temperature for 15 hours. The mixture is then poured into ice water, and the solid which forms is collected by filtration, washed with water, and dried. The mixture is chromatographed on neutral alumina, eluting with ether:hexane, to yield 17α-ethynyl-17β-acetoxy-19-norandrost-4-en-3β-ol.

Repeating this sequence of procedures with other 19-norandrost - 4 - en - 17β-ol-3-ones, androst-4-en-17β-ol-3-ones, 19-norandrosta-4,6-dien-17β-ol-3-ones, and androsta-4,6-dien-17β-ol-3-ones having hydrogen, methyl, chloro, or fluoro groups at C–6α and/or C–6β (at C–6 with 4,6-dienes); ethynyl, methylethynyl, chloroethynyl, or fluoroethynyl groups at C–17α; and hydrogen or methyl groups at C–18 yields the corresponding 3β-hydroxy-17α-ester compounds, e.g., 17α - ethynyl -17β - acetoxy-18-methyl-19-norandrost-4-en-3β-ol,
17α - methylethynyl - 17β - acetoxy-19-norandrost-4-en-3β-ol,
17α - chloroethynyl - 17β - acetoxy-19-norandrost-4-en-3β-ol,
17α - fluoroethynyl - 17β - acetoxy-19-norandrost-4-en-3β-ol,
6α - methyl - 17α - ethynyl-17β-acetoxy-19-norandrost-4-en-3β-ol,
6α - chloro - 17α - ethynyl-17β-acetoxy-19-norandrost-4-en-3β-ol,
6α - fluoro - 17α - ethynyl-17β-acetoxy-19-norandrost-4-en-3β-ol,
6β - methyl - 17α - ethynyl-17β-acetoxy-19-norandrost-4-en-3β-ol,
6β - chloro - 17α - ethynyl-17β-acetoxy-19-norandrost-4-en-3β-ol,
6β - fluoro - 17α -ethynyl-17β-acetoxy-19-norandrost-4-en-3β-ol,
6α,6β - difluoro - 17α-ethynyl-17β-acetoxy-19-norandrost-4-ene-3β-ol,
17α-ethynyl-17β-acetoxyandrost-4-en-3β-ol,
17α-ethynyl-17β-acetoxy-18-methylandrost-4-en-3β-ol,
17α-vinyl-17β-acetoxy-18-methylandrost-4-en-3β-ol, and
17α - vinyl - 17β - acetoxy-18-methyl-19-norandrost-4,6-dien-3β-ol.

EXAMPLE 10

Repeating the procedure of Example 1 but replacing 3 - methoxy - 17α - ethynylandrosta-3,5-dien-17β-ol with 17α - ethynyl - 17β - acetoxy-19-norandrost-4-en-3β-ol—3β - (5',6' - dihydro-2H-pyran-4'-yloxy)-17α-ethynyl-17β-acetoxy-19-norandrost-4-ene is obtained. Similarly, substituting the other products of Example 9 in this procedure, the corresponding 3β-ethers are obtained, e.g., 3β - (5',6' - dihydro-2H-pyran-4'-yloxy)-17α-ethynyl-17β-acetoxy-18-methyl-19-norandrost-4-ene,
3β - (5',6' - dihydro - 2H - pyran-4'-yloxy)-17α-methylethynyl-17β-acetoxy-19-norandrost-4-ene,
3β - (5',6' - dihydro - 2H - pyran-4'-yloxy)-17α-chloroethynyl-17β-acetoxy-19-norandrost-4-ene,
3β - (5',6' - dihydro - 2H - pyran - 4' - yloxy)-17α-fluoroethynyl-17β-acetoxy-19-norandrost-4-ene,
3β - (5',6' - dihydro - 2H-pyran-4'-yloxy)-6α-methyl-17α-ethynyl-17β-acetoxy-19-norandrost-4-ene,
3β - (5',6' - dihydro - 2H-pyran-4'-yloxy)-6α-chloro-17α-ethynyl-17β-acetoxy-19-norandrost-4-ene,
3β - (5',6' - dihydro - 2H-pyran-4'-yloxy)-6α-fluoro-17α-ethynyl-17β-acetoxy-19-norandrost-4-ene,
3β - (5',6' - dihydro - 2H-pyran-4'-yloxy)-6α-methyl-17α-ethynyl-17β-acetoxy-19-norandrost-4-ene,
3β - (5',6' - dihydro - 2H-pyran-4'-yloxy)-6α-chloro-17α-ethynyl-17β-acetoxy-19-norandrost-4-ene,
3β - (5',6' - dihydro - 2H-pyran-4'-yloxy)-6α-fluoro-17α-ethynyl-17β-acetoxy-19-norandrost-4-ene,
3β-(5',6'-dihydro-2H-pyran-4'-yloxy)-6α,6β-difluoro-17α-ethynyl-17β-acetoxy-19-norandrost-4-ene,
3β-(5',6'-dihydro-2H-pyran-4'-yloxy)-17α-ethynyl-17β-acetoxyandrost-4-ene,
3β-(5,6'-dihydroxy-2H-pyran-4'-xyloxy)-17α-vinyl-17β-acetoxy-18-methylandrost-4-ene,
3β-(5,6'-dihydroxy2H-pyran-4'xyloxy)-17α-vinyl-17β-acetoxy-18-methyl-19-norandrosta-4,6-diene, and
3β-(5',6'-dihydro-2H-pyran-4'-yloxy)-17α-ethynyl-17β-acetoxy-18-methylandrost-4-ene.

EXAMPLE 11

A solution of 1 g. of 3β-(5',6'-dihydro-2H-pyran-4'-yloxy)-17α - ethynyl-17β - acetoxy-19-norandrost-4-ene in 50 ml. of methanol is heated at reflux for three hours with a solution of potassium hydroxide in 1 ml. of water. The reaction mixture is then poured into ice water and the solid which forms is collected by filtration, washed with water to neutrality, and dried to yield 3β-(5',6'-dihydro-2H - pyran - 4' - yloxy)-17α-ethynyl-19-norandrost-4-en-17β-ol which is recrystallized from methylene chloride: ether.

Similarly, the other 17β-ester products of Example 10 are converted to the corresponding 17β-ols by this procedure.

EXAMPLE 12

Repeating the procedure of Example 7 but replacing 17α - ethynyl - 17β - (5',6'-dihydro-2H-pyran-4'-yloxy)-19-norandrost - 4- en - 3 - one with 17α-ethynyl-19-norandrost-4-en-17β-ol-3-one—17α-ethynyl - 19 - norandrost-4-en-3β,17β-diol is obtained. Then repeating the procedure of Example 1 but replacing 3 - methoxy-17α-ethynylandrosta - 3,5 - dien-17β-ol with 17α - ethynyl-19-norandrost - 4 -en-3β,17β-diol and using 4 ml. instead of 2 ml. of 4' - methoxy - 5',6'-dihydro-2H-pyran—3β,-17β-bis(5',6'-dihydro - 2H - pyran-4'-yloxy)-17α-ethynyl-19-norandrost-4-ene is obtained.

Repeating this sequence of procedures with other 19-norandrost-4-en-17β-ol-3-ones, androst-4-en-17β-ol-3-ones, 19-norandrosta-4,6-dien-17β-ol-3-ones, and androsta-4,6-dien-17β-ol-3-ones having hydrogen, methyl, chloro, or fluoro groups at C–6α and/or C–6β positions (at C–6 with 4, 6-dienes); lower alkenyl, 2",2" - difluorocyclopropenyl, ethynyl, methylethynyl, chloroethynyl, or fluoroethynyl groups at C–17α; and hydrogen or methyl at C–18 yields the corresponding 3β,17β-biethers, e.g., 3β,17β-bis(5',6'-dihydro - 2H - pyran - 4'-yloxy)-17α-ethynylandrost-4-ene, 3β,17β-bis(5',6'-dihydro-2H-pyran-4'-yloxy) - 17α-ethynyl-18-methyl-19-norandrost-4-ene, and the like.

EXAMPLE 13

Repeating the procedure of Example 1 but replacing 3-methoxy -17α - ethynylandrosta - 3,5-dien-17β-ol with 17α - ethynyl-19-norandrost-5(10)-en-17β-ol-3-one—17α-ethynyl - 17β - (5',6'-dihydro-2H-pyran-4'-yloxy)-19-norandrost-5(10)-en-3-one is obtained.

Similarly, repeating this procedure with other 19-norandrost - 5(10) - en-17β-ol-3-ones having hydrogen or methyl at C–18 and vinyl, 2",2" - difluorocyclopropenyl, ethynyl, methylethynyl, chloroethynyl, or fluoroethynyl groups at C–17α yields the corresponding 17β-(5',6'-dihydro-2H-pyran-4'-yloxy) compounds, e.g., 17α-ethynyl-17β-(5',6'-dihydro-2H-pyran-4'-yloxy)-18-methyl-19-norandrost-5(10)-en-3-one,
17α-methylethynyl-17β-(5',6'-dihydro-2H-pyran-4'-yloxy)-19-norandrost-5(10)-en-3-one,
17α-chloroethynyl-17β-(5',6'-dihydro-2H-pyran-4'-yloxy)-19-norandrost-5(10)-en-3-one,
17α-fluoroethynyl-17β-(5'6'-dihydro-2H-pyran-4'-yloxy)-19-norandrost-5(10)-en-3-one,
17α-methylethynyl-17β-(5',6'-dihydro-2H-pyran-4'-yloxy)-18-methyl-19-norandrost-5(10)-en-3-one,
17α-chloroethynyl-17β-(5'6'-dihydro-2H-pyran-4'-yloxy)-18-methyl-19-norandrost-5(10)-en-3-one, and
17α-fluoroethynyl-17β-(5',6'-dihydro-2H-pyran-4'-yloxy)-18-methyl-9-norandrost-5(10)-en-3-one.

EXAMPLE 14

A solution of 1 g. of 17α-ethynyl-17β-(5',6'-dihydro-2H-pyran-4'-yloxy)-19-norandrost-5(10)-en-3 - one in 50 ml. of tetrahydrofuran is added over a 30-minute period to a stirred suspension of 1 g. of lithium aluminum hydride in 50 ml. of anhydrous tetrahydrofuran and this mixture is heated at reflux for two hours. To the mixture are cautiously added 5 ml. of ethylacetate and 2 ml. of water. Sodium sulfate is next added, the mixture is filtered, and the solid thus collected is washed with hot ethylacetate. The combined organic solutions are then evaporated to yield 17α - ethynyl - 17β-(5'6'-dihydro-2H-pyran-4'-yloxy)-19-norandrost-5(10)-en-3β-ol which may be further purified through recrystallization from acetone: hexane.

Similarly, repeating this procedure with other products of Example 13 yields the corresponding 3β-hydroxy derivatives, e.g., 17α-ethynyl-17β-(5',6'-dihydro-2H-pyran-4'-yloxy)-18-methyl-19-norandrost-5(10)-en-3β-ol,
17α-methylethynyl-17β-(5',6'-dihydro-2H-pyran-4'-yloxy)-19-norandrost-5(-10)-en-3β-ol,
17α-chloroethynyl-17β-(5',6'-dihydro-2H-pyran-4'-yloxy)-19-norandrost-5(10)-en-3β-ol,
17α-fluoroethynyl-17β-(5'6'-dihydro-2H-pyran-4'-yloxy)-19-norandrost-5(10)-en-3β-ol,
17α-methylethynyl-17β-(5',6'-dihydro-2H-pyran-4'-yloxy)-18-methyl-19-norandrost-5(10)-en-3β-ol,
17α-chloroethynyl-17β-(5',6'-dihydro-2H-pyran-4'-yloxy)-18-methyl-19-norandrost-5(10)-en-3β-ol, and
17α-fluoroethynyl-17β-(5',6'-dihydro-2H-pyran-4'-yloxy)-18-methyl-19-norandrost-5(10)-en-3β-ol.

EXAMPLE 15

A mixture of 1 g. of 17α-ethynyl-17β-(5',6'-dihydro-4'-yloxy)-19-norandrost-5(10)-en-3β-ol, 4 ml. of pyridine, and 2 ml. of acetic anhydride is allowed to stand at room temperature for 15 hours. The mixture is then poured into ice water and the solid which forms is collected by filtration, washed with water, and dried to yield 3β-acetoxy-17α-ethynyl-17β - (5',6'-dihydro-2H-pyran-4'-yloxy)-19-norandrost - 5(10)-ene which may be further purified through recrystallization from acetone:hexane.

Similarly, repeating this procedure with other products of Example 4 yields the corresponding 3β-acetoxy derivatives, e.g., 3β-acetoxy-17α-ethynyl-17β-(5',6'-dihydro-2H-pyran-4'-yloxy)-18-methyl-19-norandrost - 5(10) - ene, 3β-acetoxy-17α-ethynyl-17β-(5',6'-dihydro - 2H - pyran-4'-yloxy)androst-5(10)-ene, 3β-acetoxy-17α-ethynyl-17β-(5',6'-dihydro-2H-pyran-4'-yloxy) - 18 - methylandrost-5(10)-ene, and the like.

EXAMPLE 16

Repeating the procedure of Example 14 but replacing 17α-ethynyl-17β-(5',6'-dihydro-2H-pyran - 4' - yloxy)-19-norandrost-5(10)-en-3-one with 17α-ethynyl - 19 - norandrost - 5(10) - en-17β-ol-3-one—17α-ethynyl-19-norandrost-5(10)-ene-3β,17β-diol is obtained.

A mixture of 1 g. of 17α-ethynyl-19-norandrost-5(10)-ene-3β,17β-diol, 4 ml. of pyridine, and 2 ml. of acetic anhydride is allowed to stand at room temperature for 15 hours. The mixture is then poured into ice water, and the solid which forms is collected by filtration, washed with water, and dried. The mixture is chromatographed on neutral alumina, eluting with ether:hexane, to yield 17α-ethynyl-17β-acetoxy-19-norandrost-5(10)-en-3β-ol.

Repeating this sequence of procedures with other 19-norandrost-5(10)-en-17β-ol-3-ones having vinyl, 2",2"'-difluorocyclopropenyl, ethynyl, methylethynyl, chloroethynyl, or fluoroethynyl groups at C–17α and hydrogen or methyl groups at C–18 yields the corresponding 3β-hydroxy-17α-ester compounds, e.g., 17α - ethynyl - 17β - acetoxy-18-methyl-19-norandrost-5(10)-en-3β-ol,
17α - methylethynyl - 17β - acetoxy-19-norandrost-5(10)-en-3β-ol,
17α - chloroethynyl - 17β - acetoxy-19-norandrost-5(10)-en-3β-ol,
17α - fluoroethynyl - 17β - acetoxy-19-norandrost-5(10)-en-3β-ol,
17α - methylethynyl - 17β - acetoxy-18-methyl-19-norandrost-5(10)-en-3β-ol,
17α - chloroethynyl - 17β - acetoxy-18-methyl-19-norandrost-5(10)-en-3β-ol, and
17α - fluoroethynyl - 17β - acetoxy-18-methyl-19-norandrost-5(10)-en-3β-ol.

EXAMPLE 17

Repeating the procedure of Example 1 but replacing 3-methoxy-17α-ethynylandrosta-3,5-dien-17β-ol with 17α-ethylyl - 17β-acetoxy-19-norandrost-5(10)-en-3β-ol—3β-(5',6'-dihydro-2H-pyran-4'-yloxy) - 17α - ethynyl - 17β-acetoxy-19-norandrost-5(10)-ene is obtained. Similarly using the other products of Example 16, the corresponding 3β-ethers are obtained, e.g., 3β - (5',6'-dihydro-2H-pyran-4'-yloxy) - 17α-ethynyl-17β-acetoxy-18-methyl-19-norandrost-5(10)-ene,
3β - (5',6'-dihydro-2H-pyran-4'-yloxy) - 17α - methylethynyl-17β-acetoxy-19-norandrost-5(10)-ene,
3β - (5',6'-dihydro-2H-pyran-4'-yloxy) - 17α - chloroethynyl-17β-acetoxy-19-norandrost-5(10)-ene,
3β - (5',6'-dihydro-2H-pyran-4'-yloxy) - 17α - fluoroethynyl-17β-acetoxy-19-norandrost-5(10)-ene,
3β - (5',6'-dihydro-2H-pyran-4'-yloxy) - 17α - methylethynyl-17β-acetoxy-19-norandrost-5(10)-ene.
3β - (5',6'-dihydro-2H-pyran-4'-yloxy) - 17α - chloroethynyl-17β-acetoxy-19-norandrost-5(10)-ene, and
3β - (5',6'-dihydro-2H-pyran-4'-yloxy) - 17α - fluoroethynyl-17β-acetoxy-19-norandrost-5(10)-ene.

EXAMPLE 18

A solution of 1 g. of 3β-(5',6'-dihydro-2H-pyran-4'-yloxy) - 17α - ethynyl-17β-acetoxy-19-norandrost-5(10)-ene in 50 ml. of methanol is heated at reflux for three hours with a solution of potassium hydroxide in 1 ml. of water. The reaction mixture is then poured into ice water and the solid which forms is collected by filtration, washed with water to neutrality, and dried to yield 3β-(5',6'-dihydro-2H-pyran-4'-yloxy) - 17α-ethynyl-19-norandrost-5(10)-en-17β-ol which is recrystallized from methylene chloride:ether.

Similarly, the other 17β-ester products of Example 17 are converted to the corresponding 17β-ols by this procedure.

EXAMPLE 19

Repeating the procedure of Example 14 but replacing 17α - ethynyl-17β-(5',6'-dihydro-2H-pyran-4'-yloxy)-19-norandrost - 5(10) - en-3-one with 17α-ethynyl-19-norandrost - 5(10) - en - 17β-ol-3-one—17α-ethynyl-19-norandrost-5(10)-ene-3β, 17β-diol is obtained. Then repeating the procedure of Example 1 but replacing 3-methoxy-17α - ethynylandrost-3,5-dien-17β-ol with 17α-ethynyl-19-norandrost-5(10)-ene-3β, 17β-diol and using 4 ml. rather than 2 ml. of 4'-methoxy-5',6'-dihydro-2H-pyran—3β, 17β - bis(5',6'-dihydro-2H-pyran-4'-yloxy) - 17α-ethynyl-19-norandrost-5(10)-ene is obtained.

Repeating this sequence of procedures with other 19-norandrost-5(10)-en-17β-ol-3-ones having vinyl, 2",2"'-difluorocyclopropenyl, ethynyl, methylethynyl, chloroethynyl, or fluoroethynyl groups at C–17α and hydrogen or methyl at C–18 yields the corresponding 3β, 17β-bis-ethers, e.g., 3β, 17β-bis(5',6'-dihydro-2H-pyran-4'-yloxy)-17α-methylethynyl-18-methyl-9-norandrost-4-ene, 3β, 17β-bis(5',6'-dihydro-2H-pyran-4'-yloxy) - 17α - ethynyl-18-methyl-19-norandrost-5(10)-ene, and the like.

EXAMPLE 20

Repeating the procedure of Example 1 but replacing 3 - methoxy - 17α-ethynylandrost-3,5-dien-17β-ol with 17α - ethynyl - 19 - norandrosta-4,9(10)-dien-17β-ol-3- one—17α - ethynyl - 17β - (5',6'-dihydro-2H-pyran-4'-yloxy)-19-norandrosta-4,9(10)-dien-3-one is obtained.

Similarly, repeating this procedure with other 19-norandrosta-4,9(10)-dien-17β-ol-3-ones and 19-norandrosta-4,9(10), 11-trien-17β-ol-3-ones having hydrogen or methyl at C–18 and lower alkenyl, lower alkynyl, lower haloalkynyl, cyclopropenyl, mono- and dihalocyclopropenyl groups at C–17α- yields the corresponding 17β-(5',6'-dihydro-2H-pyran-4'-yloxy) compounds, e.g., 17α - ethynyl - 17β - (5',6'-dihydro-2H-pyran-4'-yloxy)-18-methyl-19-norandrosta-4,9(10)-dien-3-one, 17α - fluoroethynyl - 17β - (5',6'-dihydro-2H-pyran-4'-yloxy)-19-norandrosta-4,9(10)-dien-3-one, 17α-fluoroethynyl-17β-(5',6'-dihydro-2H-pyran-4'-yloxy)-18-methyl-19-norandrosta-4,9(10)-dien-3-one, 17α-vinyl-17β-(5',6'-dihydro-2H-pyran-4'-yloxy)-19-norandrosta-4,9(10)-dien-3-one, 17α-vinyl-17β-(5',6,-dihydro-2H-pyran-4'-yloxy)-18-methyl-19-norandrosta-4,9(10)-dien-3-one, 17α(2'',2''-difluorocyclopropenyl)-17β-(5',6'-dihydro-2H-pyran-4'-yloxy)-19-norandrosta-4,9(10)-dien-3-one, 17α-(2'',2''-difluorocyclopropenyl)-17β-(5',6'-dihydro-2H-pyran-4'-yloxy)-18-methyl-19-norandrosta-4,9(10),11-trien-3-one, 17α-(2'',2''-difluorocyclopropenyl)-17β-(5',6'-dihydro-2H-pyran-4'-yloxy)-19-norandrosta-4,9(10),11-trien-3-one, 17α-vinyl-17β-(5',6'-dihydro-2H-pyran-4'-yloxy)-18-methyl-19-norandrosta-4,9(10),11-trien-3-one, 17α-vinyl-17β-(5',6'-dihydro-2H-pyran-4'-yloxy)-19-norandrosta-4,9(10),11-trien-3-one, 17α-ethynyl-17β-(5',6'-dihydro-2H-pyran-4'-yloxy)-18-methyl-19-norandrosta-4,9(10),11-trien-3-one, 17α-ethynyl-17β-(5',6'-dihydro-2H-pyran-4'-yloxy)-19-norandrosta-4,9(10),11-trien-3-one, 17α-fluoroethynyl-17β-(5',6'-dihydro-2H-pyran-4'-yloxy)-18-methyl-19-norandrosta-4,9(10),11-trien-3-one, 17α-fluoroethynyl-17β-(5',6'-dihydro-2H-pyran-4'-yloxy)-19-norandrosta-4,9(10),11-trien-3-one, 17α-chloroethynyl-17β-(5',6'-dihydro-2H-pyran-4'-yloxy)-19-norandrosta-4,9(10)-dien-3-one, and the like.

EXAMPLE 21

A solution of 1 g. of 17α-ethynyl-17β-(5',6'-dihydro-2H-pyran-4'-yloxy)-19-norandrosta-4,9(10)-dien - 3 - one in 50 ml. of tetrahydrofuran is added over a 30-minute period to a stirred suspension of 1 g. of lithium tri-t-butoxy aluminum hydride in 50 ml. of anhydrous tetrahydrofuran and this mixture is heated at reflux for two hours. To the mixture are cautiously added 5 ml. of ethylacetate and 2 ml. of water. Sodium sulfate is next added, the mixture is filtered, and the solid thus collected is washed with hot ethylacetate. The combined organic solutions are then evaporated to yield 17α-ethynyl-17β-(5',6'-dihydro-2H-pyran-4'-yloxy) -19- norandrosta - 4,9(10)-dien-3β-ol which may be further purified through recrystallization from acetone:hexane.

Similarly, repeating this procedure with other products of Example 20 yields the corresponding 3β-hydroxy derivatives, e.g., 17α-ethynyl-17β-(5',6'-dihydro-2H-pyran-4'-yloxy)-18-methyl-19-norandrosta-4,9(10)-dien-3β-ol, 17α-fluoroethynyl-17β-(5',6'-dihydro-2H-pyran-4'-yloxy)-19-norandrosta-4,9(10)-dien-3β-ol, 17α-fluoroethynyl-17β-(5',6'-dihydro-2H-pyran-4'-yloxy)-18-methyl-19-norandrosta-4,9(10)-dien-3β-ol, 17α-vinyl-17β-(5',6'-dihydro-2H-pyran-4'-yloxy)-19-norandrosta-4,9(10)-dien-3β-ol, 17α-vinyl-17β-(5',6'-dihydro-2H-pyran-4'-yloxy)-18-methyl-19-norandrosta-4,9(10)-dien-3β-ol, 17α-(2'',2''-difluorocyclopenyl)-17β-(5',6'-dihydro-2H-pyran-4'-yloxy)-19-norandrosta-4,9(10)-dien-3β-ol, 17α-(2'',2''-difluorocyclopropenyl)-17β-(5',6'-dihydro-2H-pyran-4'-yloxy)-18-methyl-19-norandrosta-4,9(10),11-trien-3β-ol, 17α-(2'',2''-difluorocyclopropenyl)-17β-(5',6'-dihydro-2H-pyran-4'-yloxy)-19-norandrosta-4,9(10),11-trien-3β-ol, 17α-vinyl-17β-(5',6'-dihydro-2H-pyran-4'-yloxy)-18-methyl-19-norandrosta-4,9(10),11-trien-3β-ol, 17α-vinyl-17β-(5',6'-dihydro-2H-pyran-4'-yloxy)-19-norandrosta-4,9(10),11-trien-3β-ol, 17α-ethynyl-17β-(5',6'-dihydro-2H-pyran-4'-yloxy)-18-methyl-19-norandrosta-4,9(10),11-trien-3β-ol, 17α-ethynyl-17β-(5',6'-dihydro-2H-pyran-4'-yloxy)-19-norandrosta-4,9(10),11-trien-3β-ol, 17α-fluoroethynyl-17β-(5',6'-dihydro-2H-pyran-4'-yloxy)-18-methyl-19-norandrosta-4,9(10),11-trien-3β-ol, 17α-fluoroethynyl-17β-(5',6'-dihydro-2H-pyran-4'-yloxy)-19-norandrosta-4,9(10),11-trien-3β-ol, 17α-fluoroethynyl-17β-(5',6'-dihydro-2H-pyran-4'-yloxy)-19-norandrosta-4,9(10)-dien-3β-ol, and the like.

EXAMPLE 22

A mixture of 1 g. of 17α-ethynyl-17β-(5',6'-dihydro-2H-pyran-4'-yloxy)-19-norandrosta - 4,9(10)-dien - 3β-ol, 4 ml. of pyridine, and 2 ml. of acetic anhydride is allowed to stand at room temperature for 15 hours. The mixture is then poured into ice water and the solid which forms is collected by filtration, washed with water, and dried to yield 3β - acetoxy-17α-ethynyl-17β-(5',6'-dihydro-2H-pyran-4'-yloxy)-19-norandrosta-4,9(10)-diene which may be further purified through recrystallization from acetone: hexane.

Similarly, repeating this procedure with other products of Example 21 yields the corresponding 3β-acetoxy derivatives, e.g., 3β - acetoxy - 17α-ethynyl-17β-(5',6'-dihydroxy-2H-pyran-4'-yloxy)-18-methyl - 19 - norandrosta-4,9(10)-diene, 3β-acetoxy-17α-ethynyl-17β-(5',6'-dihydro-2H-pyran-4'-yloxy)androsta-4,9(10)-diene, 3β - acetoxy-17α-ethynyl-17β-(5',6'-dihydro-2H-pyran-4' - yloxy) - 18-methylandrosta-4,9(10)-diene, and the like.

EXAMPLE 23

Repeating the procedure of Example 21 but replacing 17α-ethynyl-17β-(5',6'-dihydro - 2H - pyran - 4'-yloxy)-19-norandrosta - 4 - en - 3-one with 17α-ethynyl-19-norandrosta-4,9(10)-dien - 17β - ol - 3 - one—17α-ethynyl-19-norandrosta-4,9(10)-dien-3β,17β-diol is obtained.

A mixture of 1 g. of 17α-ethynyl-19-norandrosta-4,9(10)-diene-3β,17β-diol, 4 ml. of pyridine, and 2 ml. of acetic anhydride is allowed to stand at room temperature for 15 hours. The mixture is then poured into ice water, and the solid which forms is collected by filtration, washed with water, and dried. The mixture is chromatographed on neutral alumina, eluting with ether:hexane, to yield 17α-ethynyl-17β-acetoxy-19-norandrosta-4,9(10)-dien-3β-ol.

Repeating this sequence of procedures with other 19-norandrosta-4,5(10)-dien-17β-ol-3 - ones and 19-norandrosta-4,5(10),11-trien-17β-ol-3-ones having lower alkenyl, lower alkynyl, lower haloalkynyl, cyclopropenyl, and halocyclopropenyl groups at C–17α and hydrogen or methyl groups at C–18 yields the corresponding 3β-hydroxy-17α-ester compounds, e.g., 17α-ethynyl-17β-acetoxy-18-methyl-19-norandrosta-4,9(10)-dien-3β-ol, 17α-vinyl-17β-acetoxy-19-norandrosta-4,9(10)-dien-3β-ol, 17α-vinyl-17β-acetoxy-18-methyl-19-norandrosta-4,9(10)-dien-3β-ol, fluoroethynyl-17β-acetoxy-19-norandrosta-4,9(10)-dien-3β-ol, fluoroethynyl-17β-acetoxy-18-methyl-19-norandrosta-4,9(10)-dien-3β-ol, 17α-(2'',2''-difluorocyclopropenyl)-17β-acetoxy-19-norandrosta-4,9(10)-dien-3β-ol, 17α-(2″,2″-difluorocyclopropenyl)-17β-acetoxy-18-methyl-19-norandrosta-4,9(10)-dien-3β-ol,
17α-ethynyl-17β-acetoxy-18-methyl-19-norandrosta-4,9(10)-trien-3β-ol,
17α-ethynyl-17β-acetoxy-19-norandrosta-4,9(10),11-trien-3β-ol,
17α-vinyl-17β-acetoxy-18-methyl-19-norandrosta-4,9(10),11-trien-3β-ol,
17α-vinyl-17β-acetoxy-19-norandrosta-4,9(10),11-trien-3β-ol, and the like.

EXAMPLE 24

Repeating the procedure of Example 1 but replacing 3-methoxy-17α-ethynylandrosta-3,5-dien-17β-ol with 17α-ethynyl-17β-acetoxy-19-norandrosta-4,9(10)-dien-3β-ol—3β-(5′,6′-dihydro-2H-pyran-4′-yloxy)-17α-ethynyl-17β-acetoxy-19-norandrosta-4,9(10)-diene is obtained. Similarly, substituting the other products of Example 23 in this procedure, the corresponding 3β-ethers are obtained, e.g., 3β-(5′,6′-dihydro-2H-pyran-4′-yloxy)-17α-ethynyl-17β-acetoxy-18-methyl-19-norandrosta-4,9(10)-diene,
3β-(5′,6′-dihydro-2H-pyran-4′-yloxy)-17α-vinyl-17β-acetoxy-19-norandrosta-4,9(10)-diene,
3β(5′,6′-dihydro-2H-pyran-4′-yloxy)-17α-vinyl-17β-acetoxy-18-methyl-19-norandrosta4,9(10)-diene,
3β-(5′,6′-dihydro-2H-pyran-4′-yloxy)-17α-fluoroethynyl-17β-acetoxy-19-norandrosta-4,9(10)diene,
3β-(5′,6′-dihydro-2H-pyran-4′-yloxy)-17α-fluoroethynyl-17β-acetoxy-18-methyl-19-norandrosta-4,9(10)-diene,
3β-(5′,6′-dihydro-2H-pyran-4′-yloxy)-17α-(2″,2″-difluorocyclopropenyl)-17β-acetoxy-19-norandrosta-4,9(10)-diene,
3β-(5′,6′-dihydro-2H-pyran-4′-yloxy)-17α-(2″,2″-difluorocyclopropenyl)-17β-acetoxy-18-methyl-19-norandrosta-4,9(10)-diene,
3β-(5′,6′-dihydro-2H-pyran-4′-yloxy)-17α-ethynyl-17β-acetoxy-18-methyl-19-norandrosta-4,9(10),11-triene,
3β-(5′,6′-dihydro-2H-pyran-4′-yloxy)-17α-ethynyl-17β-acetoxy-19-norandrosta-4,9(10),11-triene,
3β-(5′,6′-dihydro-2H-pyran-4′-yloxy)-17αvinyl-17β-acetoxy-18-methyl-19-norandrosta-4,9(10),11-triene,
3β-(5′,6′-dihydro-2H-pyran-4′-yloxy)-17α-vinyl-17β-acetoxy-19-norandrosta4,9(10),11-triene, and the like.

EXAMPLE 25

A solution of 1 g. of 3β-(5′,6′-dihydro-2H-pyran-4′-yloxy)-17α-ethynyl-17β-acetoxy-19-norandrosta-4,9(10)-diene in 50 ml. of methanol is heated at reflux for three hours with a solution of potassium hydroxide in 1 ml. of water. The reaction mixture is then poured into ice water and the solid which forms is collected by filtration, washed with water to neutrality, and dried to yield 3β-(5′,6′-dihydro-2H-pyran-4′-yloxy)-17α-ethynyl-19-norandrosta-4,9(10)-dien-17β-ol which is recrystallized from methylene chloride:ether.

Similarly, the other 17β-ester products of Example 24 are converted to the corresponding 17β-ols by this procedure.

EXAMPLE 26

Repeating the procedure of Example 21 but replacing 17α-ethynyl-17β-(5′,6′-dihydro-2H-pyran-4′-yloxy)-19-norandrosta-4,9(10)-dien-3-one with 17α-ethynyl-19-norandrosta-4,9(10)-dien-17β-ol-3-one—17α-ethynyl-19-norandrosta-4,9(10)-diene-3β,17β-diol is obtained. Then repeating the procedure of Example 1 but replacing 3-methoxy-17α-ethynylandrosta-3,5-dien-17β-ol with 17α-ethynyl-19-norandrosta-4,9(10)-diene-3β,17β-diol and using 4 ml. instead of 2 ml. of 4′-methoxy-5′,6′-dihydro-2H-pyran—3β,17β-bis(5′,6′-dihydro-2H-pyran-4′-yloxy)-17α-ethynyl-19-norandrosta-4,9(10)-diene is obtained.

Repeating this sequence of procedures with other 19-norandrosta-4,9(10)-dien-17β-ol-3-ones and 19-norandrosta-4,9(10),11-trien-17β-ol-3-ones having lower alkenyl (e.g., vinyl, propenyl), lower alkynyl, lower haloalkynyl (e.g., ethynyl, methylethynyl, chloroethynyl, or fluoroethynyl), cyclopropenyl, and halocyclopropenyl groups at C–17α and hydrogen or methyl at C–18 yields the corresponding 3β,17β-bisethers, e.g., 3β,17β-bis(5′,6′-dihydro-2H-pyran-4′-yloxy)-17α-ethynylandrosta-4,9(10)-diene, 3β,17β-bis(5′,6′-dihydro-2H-pyran-4′-yloxy)-17α-ethynyl-18-methyl-19-norandrosta-4,4(10),11-triene, and the like.

The invention claimed is:

1. A 5′,6′-dihydro-2H-pyran-4′-yl ether selected from the group consisting of
   (a) 17β-(5′,6′-dihydro-2H-pyran-4′-yloxy)androsta-3,5-dienes and 17β-(5′,6′-dihydro-2H-pyran-4′-yloxy)-19-norandrosta-3,5-dienes having at position C–3, lower alkoxy or lower cycloalkoxy; at position C–17α, lower alkenyl, lower alkynyl, lower haloalkynyl, or

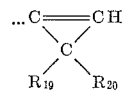

wherein $R_{19}$ and $R_{20}$ each is hydrogen, chloro, or fluoro; at position C–18, hydrogen or methyl;
   (b) androst-4-enes, 19-norandrost-4-enes, androsta-4,6-dienes, or 19-norandrosta-4,6-dienes having at position C–3, keto or

wherein $R_{50}$ is 5′,6′-dihydro-2H-pyran-4′-yloxy, hydrogen, hydroxy, or conventional hydrolyzable esters thereof; at position C–6 when the bond between carbons C–6 and C–7 is a double bond and at each of positions C–6α and C–6β when the bond between carbons C–6 and C–7 is a single bond, hydrogen, methyl, chloro, or fluoro; at position C–17α, lower alkenyl, lower alkynyl, lower haloalkynyl, or

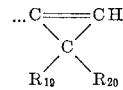

wherein $R_{19}$ and $R_{20}$ each is hydrogen, chloro, or fluoro; at C–17β, hydroxy, conventional hydrolyzable esters thereof, or 5′,6′-dihydro-2H-pyran-4′-yloxy, and at least one of said C–3 and C–17β positions having said 5′,6′-dihydro-2H-pyran-4′-yloxy group; and at position C–18, hydrogen or methyl;
   (c) 19-norandrost-5(10)-enes having at position C–3, keto or

wherein $R_{50}$ is hydrogen, hydroxy, conventional hydrolyzable esters thereof, or 5′,6′-dihydro-2H-pyran-4′-yloxy; at position C–17α, ethynyl, methylethynyl, chloroethynyl, or fluoroethynyl; at position C–17β, hydroxy, conventional hydrolyzable esters thereof, or 5′,6′-dihydro-2H-pyran-4′-yloxy, and at least one of said C–3 and C–17β positions having said 5′,6′-dihydro-2H-pyran-4′-yloxy group; and at position C–18, hydrogen or methyl;
   (d) 19-norandrosta-4,9(10)-dienes or 19-norandrosta-4,9(10),11-trienes having at position C–3, keto or

wherein $R_{50}$ is 5′,6′-dihydro-2H-pyran-4′-yloxy, hydrogen, hydroxy, or conventional hydrolyzable esters thereof; at position C–17α, lower alkenyl, lower alkynyl, lower haloalkynyl, or

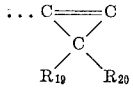

wherein $R_{19}$ and $R_{20}$ each is hydrogen, chloro, or fluoro; at position C–17β, hydroxy, conventional hydrolyzable esters thereof, or 5′,6′ - dihydro-2H-pyran-4′-yloxy and at least one of said C–3 and C–17β positions having said 5′,6′-dihydro-2H-pyran-4′-yloxy and at position C–18, hydrogen or methyl; and (e) 3β - (5′,6′ - dihydro - 2H - pyran - 4′ - yloxy) pregn-4-en-20-ones and 3β-(5′,6′-dihydro-2H-pyran-4′-yloxy)-19-norpregn-4-en-20-ones having at position C–1,2, hydrogens or

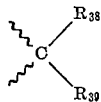

wherein each of $R_{38}$ and $R_{39}$ is hydrogen, chloro, or fluoro; at position C–6, hydrogen, methyl, fluoro, or chloro; at position C–9α, hydrogen, chloro, or fluoro, except with 3β - (5′,6′-dihydro-2H-pyran-4′-yloxy)-19-norpregn-4-en-20-ones wherein hydrogen is at C–9α when hydrogen is at C–11β; at position C–11, keto or

wherein $R_{41}$ is hydrogen, chloro, or hydroxyl; at position C–16, methylene or

wherein $R_{44}$ and $R_{45}$ each is hydrogen or methyl; at position C–17α, hydrogen, hydroxyl, hydrolyzable esters thereof or, taken together with C–16α,

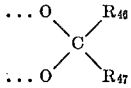

wherein each of $R_{46}$ and $R_{47}$ is hydrogen, alkyl, or aryl, the latter two having up to eight carbons; at position C–21, hydrogen or fluoro; and between the carbons at positions C–5 and C–6, a single bond, double bond, or single bond together with the methylene group

wherein $R_{51}$ and $R_{52}$ each is hydrogen, fluoro, or chloro.

2. The steroid ether of claim 1 wherein the ether is a member selected from the group consisting of 17β-(5′,6′-dihydro - 2H - pyran - 4′-yloxy)androsta-3,5-dienes and 17β - (5′,6′ - dihydro-2H-pyran-4′-yloxy)-19-norandrosta-3,5-dienes having at position C–3, a member selected from the group consisting of lower alkoxy and lower cycloalkoxy; at position 17α, a member selected from the group consisting of lower alkenyl, lower alkynyl, lower haloalkynyl, and 2″,2″-difluorocyclopropenyl; and at C–18, a member selected from the group consisting of hydrogen and methyl.

3. The steroid ether of claim 2 wherein the ether is 3-cyclopentoxy-17α-ethynyl-17β-(5′,6′-dihydro-2H-pyran-4′-yloxy)-19-norandrosta-3,5-diene.

4. The steroid ether of claim 2 wherein the ether is 3-cyclopentoxy - 17α - ethynyl-17β-(5′,6′-dihydro-2H-pyran-4′-yloxy)-18-methyl-19-norandrosta-3,5-diene.

5. The steroid ether of claim 2 wherein the ether is 3-ethoxy - 17α - ethynyl - 17β - (5′,6′-dihydro-2H-pyran-4′-yloxy)-androsta-3,5-diene.

6. The steroid ether of claim 1 wherein the ether is selected from the group consisting of androst-4-enes, 19-norandrost - 4 - enes, androsta-4,6-dienes, and 19-norandrosta-4,6-dienes having at position C–3, a member selected from the group consisting of keto and

wherein $R_{50}$ is 5′,6′-dihydro-2H-pyran-4′-yloxy, hydrogen, hydroxy, or conventional hydrolyzable esters thereof; at position C–6 when the bond between carbons C–6 and C–7 is a double bond; at each of positions C–6α and C–6β when the bond between C–6 and C–7 is a single bond, members selected from the group consisting of hydrogen, methyl, fluoro, and chloro; at position C–17α, a member selected from the group consisting of lower alkenyl, lower alkynyl, lower haloalkynyl, and

wherein $R_{19}$ and $R_{20}$ each is hydrogen, chloro, or fluoro; at C–17β, a member selected from the group consisting of hydroxy, conventional hydrolyzable esters of said hydroxy, and 5′,6′-dihydro-2H-pyran-4′-yloxy, and at least one of said C–3 and C–17β having said 5′,6′-dihydro-2H-pyran-4′-yloxy; and at C–18, a member selected from the group consisting of hydrogen and methyl groups.

7. The steroid ether of claim 6 wherein the ether is 17α-ethynyl-17β-(5′,6′-dihydro - 2H - pyran-4′-yloxy)-19-norandrost-4-en-3-one.

8. The steriod ether of claim 6 wherein the ether is 3β-acetoxy - 17α - ethynyl-17β-(5′,6′ - dihydro-2H-pyran-4′-yloxy)-19-norandrost-4-ene.

9. The steroid ether of claim 6 wherein the ether is 17α-ethynyl-17β-(5′,6′-dihydro - 2H - pyran-4′-yloxy)-18-methyl-19-norandrost-4-ene-3-one.

10. The steroid ether of claim 6 wherein the ether is 3-acetoxy-17α-ethynyl-17β-(5′,6′-dihydro - 2H - pyran-4′-yloxy)-18-methyl-19-norandrost-4-ene.

11. The steriod ether of claim 6 wherein the ether is 6α-fluoro - 17α - ethynyl-17β-(5′,6′ - dihydro-2H-pyran-4′-yloxy)-19-norandrost-4-en-3-one.

12. The steroid ether of claim 6 wherein the ether is 6α-fluoro - 17α - ethynyl-17β-(5′,6′ - dihydro-2H-pyran-4′-yloxy)-18-methyl-19-norandrost-4-en-3-one.

13. The steroid ether of claim 6 wherein the ether is 6α-methyl-17α-ethynyl-17β-(5′,6′-dihydro - 2H - pyran-4′-yloxy)-19-norandrosta-4,6-dien-3-one.

14. The steroid ether of claim 6 wherein the ether is 6α-methyl-17α-ethynyl-17β-(5′,6′-dihydro - 2H - pyran-4′-yloxy)-18-methyl-19-norandrosta-4,6-dien-3-one.

15. The steroid ether of claim 6 wherein the ether is 6α-methyl - 17α - methylethynyl - 17β - (5′,6′-dihydro-2H-pyran-4′-yloxy)androst-4-en-3-one.

16. The steroid ether of claim 6 wherein the ether is 3-(5′,6′-dihydro - 2H - pyran - 4′ - yloxy)-17α-ethynyl-19-norandrost-4-en-17β-ol.

17. The steroid ether of claim 6 wherein the ether is 3 - (5′,6′ - dihydro-2H-pyran-4′-yloxy)-17α-ethynyl-17β-acetoxy-19-norandrost-4-ene.

18. The steroid ether of claim 6 wherein the ether is 3,17β - bis(5′,6′ - dihydro-2H-pyran-4′-yloxy)-17α-ethynyl-19-norandrost-4-ene.

19. The steroid ether of claim 1 wherein the ether is a 19-norandrost-5(10)-ene having at position C–3, member selected from the group consisting of keto and

wherein $R_{50}$ is hydrogen, hydroxy, conventional hydrolyzable esters of said hydroxy, or 5′,6′-dihydro-2H-pyran-4′-yloxy; at position C–17α, a member selected from the group consisting of ethynyl, methylethynyl, chloroethynyl, and fluoroethynyl; at position C–17β, a member selected from the group consisting of hydroxy, conventional hydrolyzable esters of said hydroxy and 5′,6′-dihydro-2H-pyran-4′-yloxy, at least one of said C–3 and C–17β having said 5',6'-dihydro-2H-pyran-4'-yloxy group; and at position C-18, a member selected from the group consisting of hydrogen and methyl.

20. The steroid ether of claim 19 wherein the ether is 17α - ethynyl - 17β-(5',6'-dihydro-2H-pyran-4'-yloxy)-19-norandrost-5(10)-en-3-one.

21. The steroid ether of claim 19 wherein the ether is 17α - ethynyl-17β-(5',6'-dihydro-2H-pyran-4'-yloxy)-18-methyl-19-norandrost-5(10)-en-3-one.

22. The steroid ether of claim 1 wherein the ether is a member selected from the group consisting of 19-norandrosta-4,9(10)-dienes and 19-norandrosta-4,9(10),11-trienes having at position C-3, a member selected from the group consisting of keto and

wherein R₅₀ is 5',6'-dihydro-2H-pyran-4'-yloxy, hydrogen, hydroxy, or conventional hydrolyzable esters thereof; at position C-17α, a member selected from the group consisting of lower alkenyl, lower alkynyl, lower haloalkynyl, and

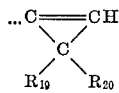

wherein R₁₉ and R₂₀ each is hydrogen, chloro, or fluoro; at position C-17β, a member selected from the group consisting of hydroxy, conventional hydrolyzable esters thereof, and 5',6' - dihydro - 2H - pyran - 4' - yloxy and at least one of said C-3 and C-17β positions having said 5',6' - dihydro - 2H - pyran - 4' - yloxy and at position C-18, a member selected from the group consisting of hydrogen and methyl.

23. The steroid ether of claim 22 wherein the ether is 17α - chloroethynyl - 17β - (5',6' - dihydro - 2H - pyran-4'-yloxy)-19-norandrosta-4,9(10)-dien-3-one.

24. The steroid ether of claim 22 wherein the ether is 17α - ethynyl - 17β - (5',6' - dihydro - 2H - pyran - 4'-yloxy)-19-norandrosta-4,9(10),11-trien-3-one.

25. The steroid ether of claim 22 wherein the ether is 17α - ethynyl - 17β - (5',6' - dihydro - 2H - pyran - 4'-yloxy)-18-methyl-19-norandrosta-4,9(10),11-trien-3-one.

26. The steroid ether of claim 1 wherein the ether is a member selected from the group consisting of 3β-(5',6'-dihydro - 2H - pyran - 4' - yloxy)pregn - 4 - en - 20 - ones and 3β - (5',6' - dihydro - 2H - pyran - 2' - yloxy) - 19-norpregn-4-en-20-ones having at position C-1,2, a member selected from the group consisting of hydrogens and the methylene group

wherein each of R₃₈ and R₃₉ is selected from the group consisting of hydrogen, chloro, and fluoro; having at position C-6, a member selected from the group consisting of hydrogen, methyl, fluoro, or chloro; at position C-9α, a member selected from the group consisting of hydrogen, chloro, and fluoro, except with 3β-(5',6'-dihydro-2H-pyran - 4' - yloxy) - 19 - norpregn - 4 - en - 20 - ones wherein hydrogen is at C-9α when hydrogen is at C-11β; at position C-11, a member selected from the group consisting of keto and

wherein R₄₁ is hydrogen, chloro, or hydroxyl; at position C-16, a member selected from the group consisting of methylene and

wherein each of R₄₄ and R₄₅ is hydrogen or methyl; at position C-17α, a member selected from the group consisting of hydrogen, hydroxyl, and conventional hydrolyzable esters thereof, and taken together with C-16α, a group having the formula

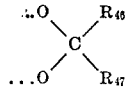

wherein R₄₆ and R₄₇ each is selected from the group consisting of hydrogen, alkyl, and aryl, the latter two groups having up to eight carbons; at position C-21, a member selected from the group consisting of hydrogen and fluoro; and at position C-5,6, a member selected from the group consisting of a double bond, a single bond, and a single bond in combination with a methylene group having the formula

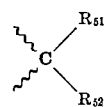

wherein R₅₁ and R₅₂ each is selected from the group consisting of hydrogen, chloro, and fluoro.

27. The steroid ether of claim 26 wherein the ether is 3β - (5',6' - dihydro - 2H - pyran - 4' - yloxy) - 6 - chloro-17α-acetoxypregna-4,6-dien-20-one.

28. The steroid ether of claim 26 wherein the ether is 3β - (5',6' - dihydro - 2H - pyran - 4' - yloxy) - 6 - chloro-17α-acetoxy-19-norpregna-4,6-dien-20-one.

29. The steroid ether of claim 26 wherein the ether is 1α,2α - methylene - 3β - (5',6' - dihydro - 2H - pyran - 4'-yloxy)-6-chloro-17α-acetoxypregna-4,6-dien-20-one.

30. The steroid ether of claim 26 wherein the ether is 3β-(5',6'-dihydro-2H-pyran-4' - yloxy) - 6 - methyl - 17α-acetoxypregna-4,6-dien-20-one.

31. The steroid ether of claim 26 wherein the ether is 3β-(5',6'-dihydro-2H-pyran-4'-yloxy)-6-methyl-17α - acetoxy-19-norpregna-4,6-dien-20-one.

32. The steroid ether of claim 26 wherein the ether is 3β-(5',6'-dihydro-2H-pyran-4'-yloxy)-6-chloro-16 - methylene-17α-acetoxypregna-4,6-dien-20-one.

33. The steroid ether of claim 26 wherein the ether is 3β-(5',6'-dihydro-2H-pyran-4'-yloxy)-6-chloro-16 - methylene-17α-acetoxypregna-4,6-dien-20-one.

34. The steroid ether of claim 26 wherein the ether is 3β-(5',6'-dihydro-2H-pyran-4' - yloxy) - 6α - methyl - 16-methylene-17α-acetoxypregn-4-en-20-one.

35. The steroid ether of claim 26 wherein the ether is 3β-(5',6'-dihydro-2H-pyran-4' - yloxy) - 6α - fluoro - 16α-methylpregn-4-en-20-one.

36. The steroid ether of claim 26 wherein the ether is 3β-(5',6'-dihydro-2H-pyran-4' - yloxy) - 6α - fluoro - 16β-methylpregn-4-en-20-one.

37. The steroid ether of claim 26 wherein the ether is 3β-5',6'-dihydro-2H-pyran-4' - yloxy) - 16α,17α - methylphenylmethylenedioxypregn-4-en-20-one.

38. The steroid ether of claim 26 wherein the ether is 3β-(5',6'-dihydro-2H-pyran-4'-yloxy)-6β - fluoro - 6α,7α-difluoromethylene-17α-acetoxypregn-4-en-20-one.

39. The steroid ether of claim 26 wherein the ether is 3β-(5',6'-dihydro-2H-pyran-4'-yloxy)-6α,16α - dimethylpregn-4-en-20-one.

40. The steroid ether of claim 26 wherein the ether is 3β-(5',6'-dihydro-2H-pyran-4'-yloxy)pregn-4 - en - 11,20-dione.

41. The steroid ether of claim 26 wherein the ether is 3β-(5',6'-dihydro-2H-pyran-4'-yloxy) - 6,9α,11β - trichloro-17α-acetoxypregna-4,6-dien-20-one.

42. The steroid ether of claim 26 wherein the ether is 3β-(5',6'-dihydro-2H-pyran-4'-yloxy)-6-chloro - 9α - fluoro-17α-acetoxypregna-4,6-dien-11β-ol-20-one.

43. The steroid ether of claim 26 wherein the ether is 3β-(5',6'-dihydro-2H-pyran-4'-yloxy)-6-chloro-17α - caproyloxypregna-4,6-dien-20-one.

44. The steroid ether of claim 26 wherein the ether is

3β-(5′,6′-dihydro-2H-pyran-4′-yloxy) - 6α - methylpregn-4-en-11,20-dione.

References Cited
UNITED STATES PATENTS

| | | | |
|---|---|---|---|
| 3,294,786 | 12/1966 | Cross et al. | 260—239.55 |
| 3,313,808 | 4/1967 | De Ruggieri et al. | 260—239.55 |
| 3,332,941 | 7/1967 | Shimizv et al. | 260—239.55 |
| 3,376,291 | 4/1968 | Fried | 260—239.55 |
| 3,377,342 | 4/1968 | Fried | 260—239.55 |

HENRY A. FRENCH, Primary Examiner

U.S. Cl. X.R.

260—397.4, 397.5, 397.45, 999